US011386569B2

(12) United States Patent
Shea et al.

(10) Patent No.: US 11,386,569 B2
(45) Date of Patent: Jul. 12, 2022

(54) SYSTEMS AND METHODS FOR SIZING OBJECTS VIA A COMPUTING DEVICE

(71) Applicant: Radius Technologies, LLC, Kennesaw, GA (US)

(72) Inventors: John David Shea, Venice, CA (US); Thomas Maurice Dantin, Jr., Ponte Vedra Beach, FL (US)

(73) Assignee: Radius Technologies, LLC, Kennesaw, GA (US)

( * ) Notice: Subject to any disclaimer, the term of this patent is extended or adjusted under 35 U.S.C. 154(b) by 0 days.

(21) Appl. No.: 16/928,783

(22) Filed: Jul. 14, 2020

(65) Prior Publication Data

US 2020/0342615 A1 Oct. 29, 2020

Related U.S. Application Data

(63) Continuation of application No. 16/741,365, filed on Jan. 13, 2020, now Pat. No. 10,755,431, which is a continuation-in-part of application No. 16/505,211, filed on Jul. 8, 2019, now Pat. No. 11,055,868.

(60) Provisional application No. 62/700,469, filed on Jul. 19, 2018.

(51) Int. Cl.
| | | |
|---|---|---|
| *G06T 7/00* | (2017.01) | |
| *G06T 7/60* | (2017.01) | |
| *G06N 5/04* | (2006.01) | |
| *G06N 20/00* | (2019.01) | |
| *G06Q 30/06* | (2012.01) | |
| *G06T 7/50* | (2017.01) | |

(52) U.S. Cl.
CPC ............. *G06T 7/60* (2013.01); *G06N 5/04* (2013.01); *G06N 20/00* (2019.01); *G06Q 30/0623* (2013.01); *G06T 7/0012* (2013.01); *G06T 7/50* (2017.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 8,649,575 B2 | 2/2014 | Nagar et al. | |
| 9,311,825 B2 | 4/2016 | Lusted et al. | |
| 9,329,717 B2 | 5/2016 | Westerman et al. | |
| 9,696,897 B2 | 7/2017 | Garcia | |
| 9,778,027 B1 * | 10/2017 | Smith | A43D 1/025 |
| 9,928,413 B2 | 3/2018 | Baca et al. | |
| 9,965,159 B2 | 5/2018 | Knodt | |
| 10,699,108 B1 * | 6/2020 | Hansen | G06Q 30/0241 |
| 10,755,431 B2 * | 8/2020 | Shea | G06T 7/60 |
| 2011/0307349 A1 | 12/2011 | Gandhi et al. | |
| 2012/0224052 A1 | 9/2012 | Bae | |

(Continued)

*Primary Examiner* — Soo Jin Park
(74) *Attorney, Agent, or Firm* — Morris, Manning & Martin, LLP; Daniel E. Sineway, Esq.; Joseph Wallace, Jr., Esq.

(57) ABSTRACT

The present disclosure generally relates to the measurement of objects. Using unique processes, the present systems and methods can determine the size of an object using a computing device. For example, in certain embodiments, the present systems and methods receive a physical object such as a foot determine the size of the foot in millimeters, and convert the size of the foot in millimeters into a shoe size.

22 Claims, 18 Drawing Sheets

(56) References Cited

U.S. PATENT DOCUMENTS

| | | | |
|---|---|---|---|
| 2013/0179288 A1* | 7/2013 | Moses | G06K 9/00369 |
| | | | 705/26.1 |
| 2014/0300722 A1* | 10/2014 | Garcia | G06F 3/0482 |
| | | | 348/77 |
| 2015/0228084 A1* | 8/2015 | Belyaev | G06T 7/60 |
| | | | 382/199 |
| 2016/0101571 A1* | 4/2016 | Schouwenburg | B33Y 80/00 |
| | | | 602/5 |
| 2017/0249783 A1* | 8/2017 | Mach Shepherd | G06T 19/20 |
| 2017/0272728 A1* | 9/2017 | Rafii | H04N 13/239 |
| 2018/0033202 A1* | 2/2018 | Lam | G06K 9/00362 |
| 2018/0160777 A1* | 6/2018 | Hei | G06Q 30/06 |
| 2018/0240238 A1* | 8/2018 | Husheer | G06K 9/00362 |
| 2019/0139252 A1* | 5/2019 | Zaiss | A43D 1/025 |
| 2020/0000180 A1* | 1/2020 | Sherrah | A43B 3/0005 |
| 2021/0142379 A1* | 5/2021 | Bleicher | G01B 11/24 |

* cited by examiner

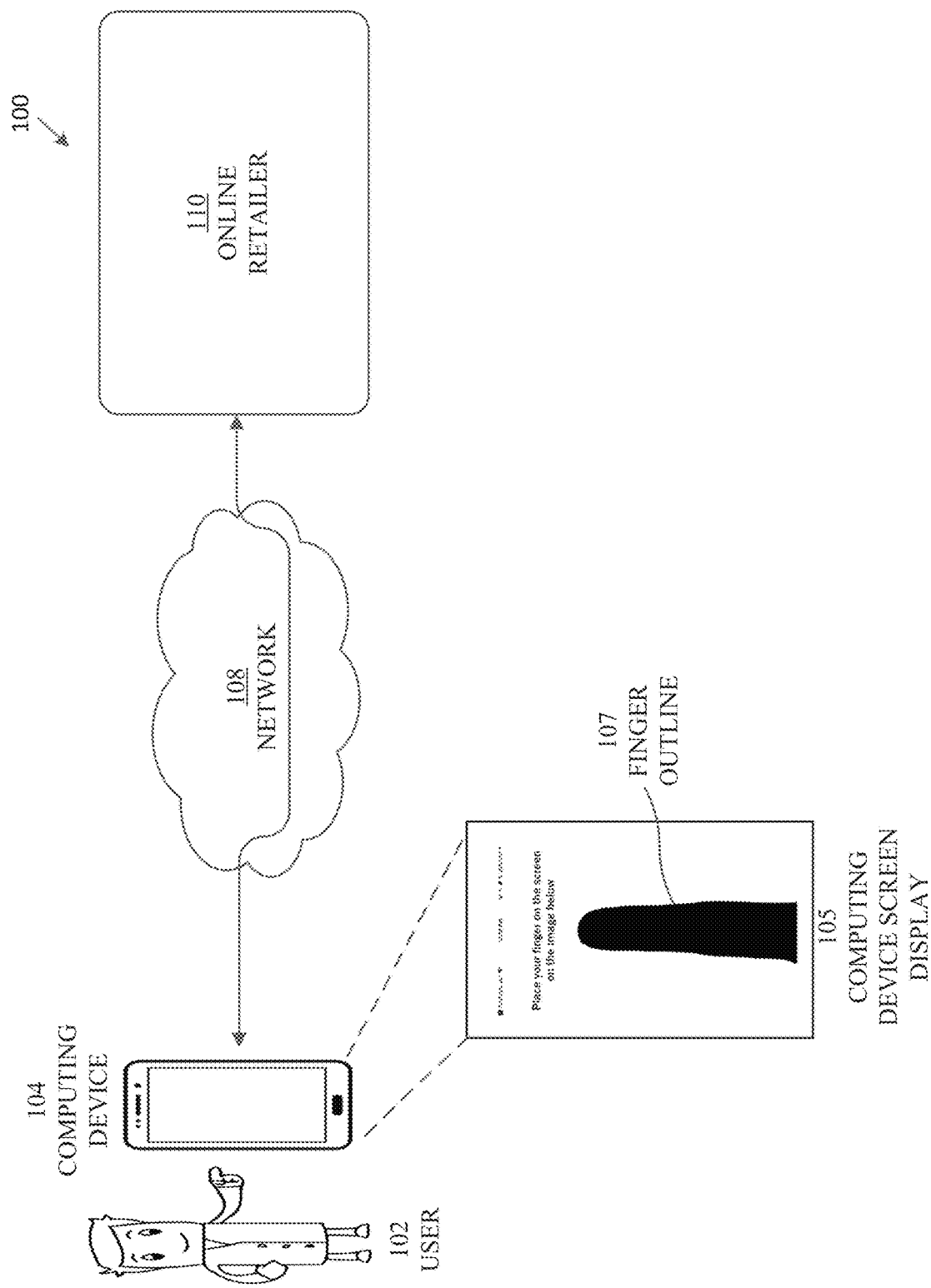
FIG. 1: EXEMPLARY SYSTEM ENVIRONMENT

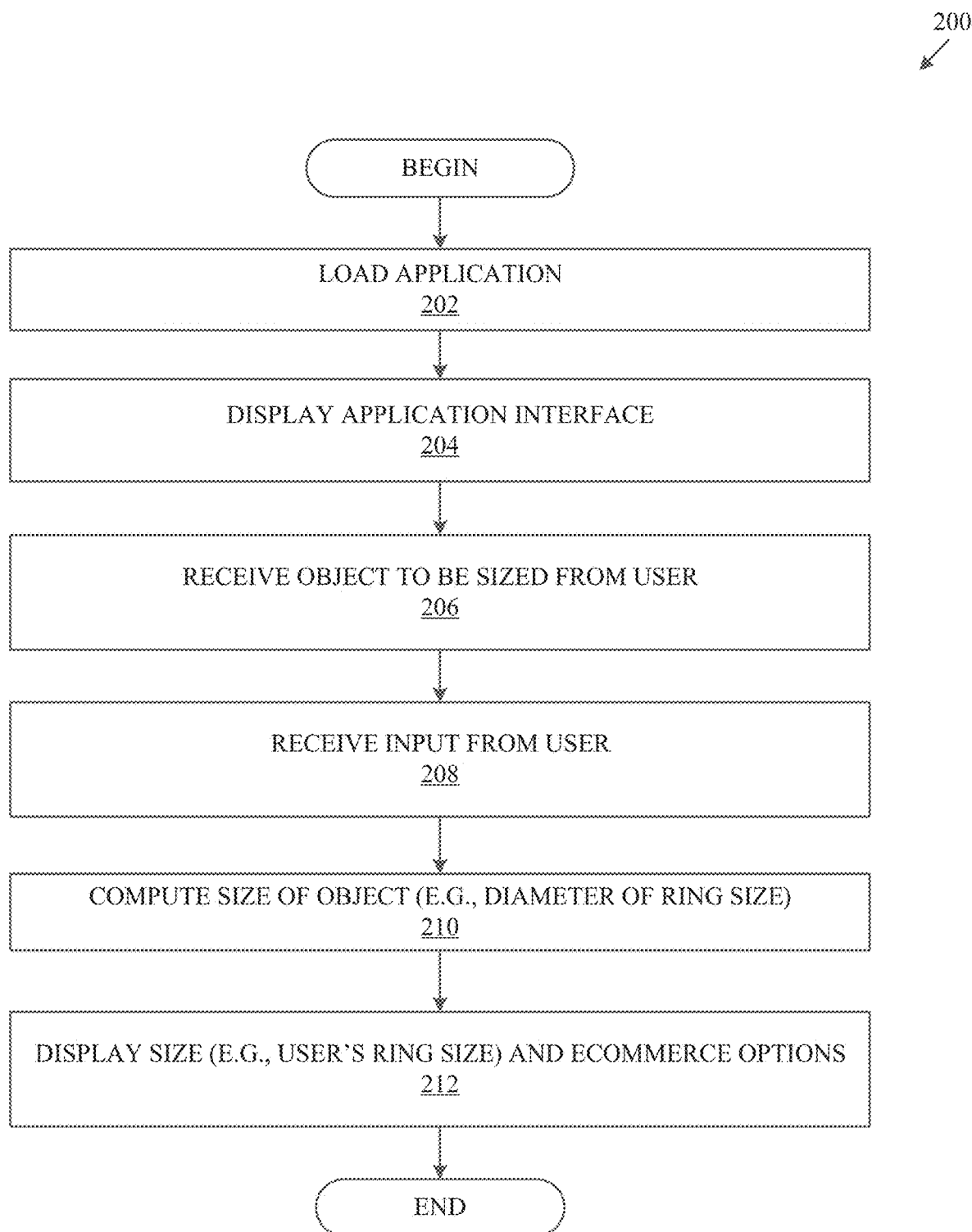
FIG. 2: EXEMPLARY FINGER SIZING PROCESS

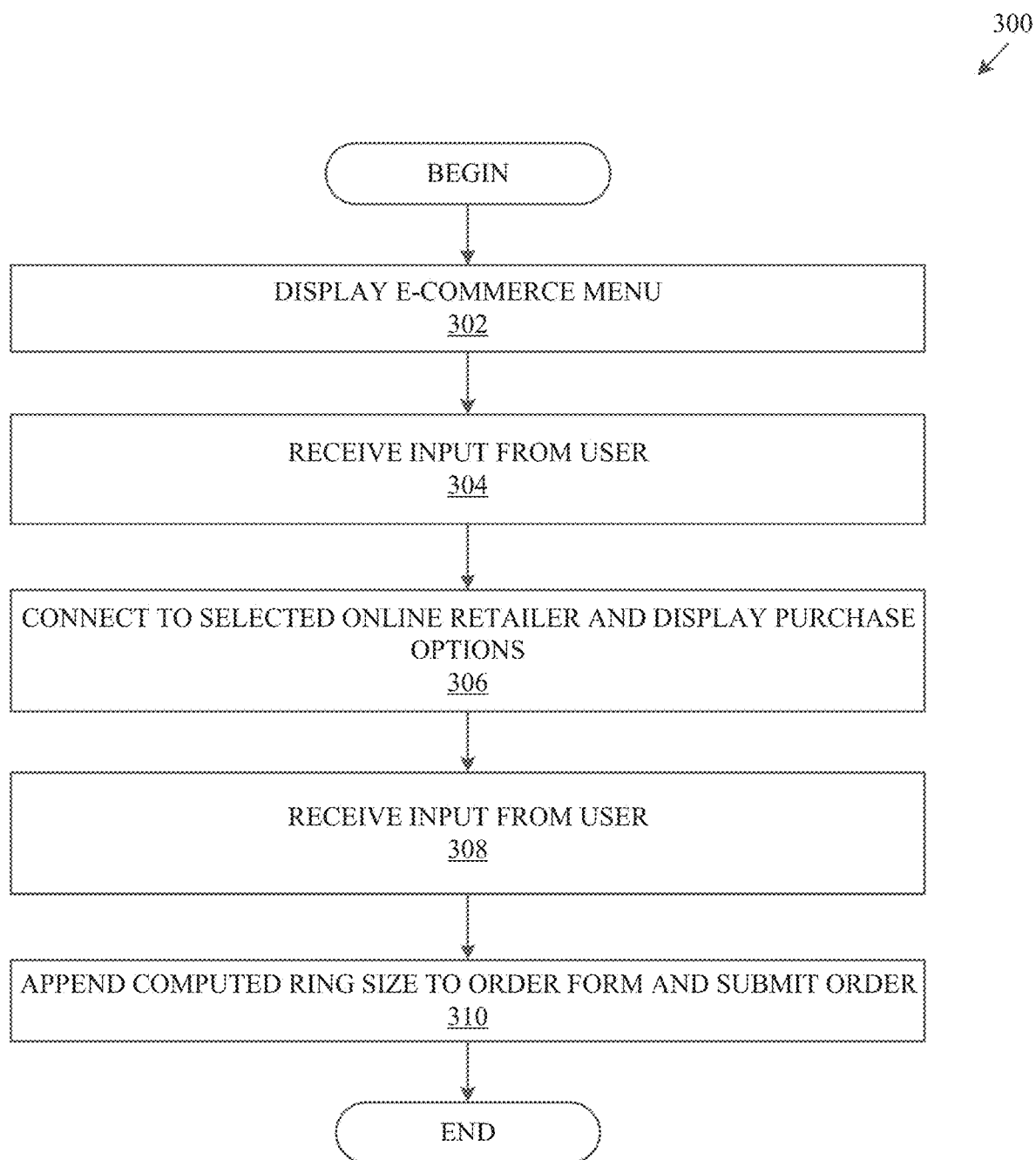
FIG. 3: EXEMPLARY E-COMMERCE RING PURCHASING PROCESS

FIG. 8: EXEMPLARY FOOT SIZING PROCESS

SYSTEMS AND METHODS FOR SIZING OBJECTS VIA A COMPUTING DEVICE

CROSS REFERENCE TO RELATED APPLICATIONS

This application is a continuation of U.S. patent application Ser. No. 16/741,365, entitled "Systems and Methods for Sizing Objects Via a Computing Device," filed Jan. 13, 2020, which is a continuation-in-part application of U.S. patent application Ser. No. 16/505,211, entitled "Systems and Methods for Sizing Objects Via a Computing Device," filed Jul. 8, 2019, which claims the benefit of and priority to U.S. Provisional Patent Application No. 62/700,469, filed Jul. 19, 2018, and entitled "Systems and Methods for Sizing Objects Via a Computing Device," each of which are hereby incorporated by reference herein as if set forth in their entireties.

TECHNICAL FIELD

The present systems and methods relate generally to measurement of objects, and more particularly to systems and methods for the measurement of physical objects, such as fingers, feet, or other anatomical objects, via a computer display interface.

BACKGROUND

Measurements are not only important in science, design, and engineering industries, but everyday tasks often require measurements as well. From calculating distance on a map, to obtaining product dimensions, to measuring necklaces, bracelets, rings, and other pieces of jewelry, having ready access to a measuring device can prove useful in a variety of contexts.

For example, each year, millions of graduating students engage in the process of purchasing class rings as a symbolic representation of their achievement. As a requisite step to purchasing a class ring, each student must obtain a ring size based on the measurement of his or her finger. Generally, the ring sizing process involves a student's physical presence in a store, or employs a physical sizing chart, such that the results can be relayed to a ring retailer upon taking additional measures (e.g., emailing the results, telephoning the results, entering the results into a customer portal on the Internet, etc.).

Similarly, the footwear industry is a multi-billion dollar industry in which purchasers must know the size of their feet prior to purchasing a shoe. Furthermore, shoes produced by different manufacturers may fit differently, so it may be useful for a purchaser to know the size of their shoes as they relate to specific brands. Generally, the shoe purchasing process also involves a purchaser's physical presence in a store to use a bulky foot measuring device, or to try on different shoe sizes until they arrive at the size that is most comfortable to them. This is especially true with children, whose shoe size can change significantly from year to year, or even from month to month.

As society moves into an era where instant gratification is becoming an expectation, not only is there a general lack of immediate access to measuring devices, but the ring sizing and shoe purchasing processes specifically have become severely antiquated in their implementation. The requirement of a person's physical presence to accomplish an intermediary task is a scarcity, and the ring sizing and shoe purchasing processes are two of the few retail mechanisms that maintain this requirement. Therefore, there is a long-felt but unresolved need for a system or method that can expeditiously and accurately measure a physical object, such as a ring finger or foot, without the need for antiquated measuring equipment or an in-store or on-location experience.

BRIEF SUMMARY OF DISCLOSURE

Briefly described, and according to one embodiment, aspects of the present disclosure generally relate to sizing objects virtually. In one embodiment, the present systems and methods allow for a user to obtain the measurement of an object that is capable of being rested on the screen display of a computing device (e.g., a pencil, a watch band, a bolt, etc.). In another embodiment, the present systems and methods allow for a user to obtain the measurement of an object that is capable of hovering above the camera system of a computing device (e.g., a book, a box, etc.). In one embodiment, the object for measurement may be a user's finger for the purpose of generating a ring size. In another embodiment, the object for measurement may be a user's foot for the purpose of generating a shoe size. Traditionally, ring sizes and shoe sizes are obtained by engaging with a physical device, such that a measurement can be ascertained and correlated to a ring size or shoe size. In these traditional embodiments, the physical devices generally provide limited additional functionality apart from determining ring size and/or shoe size. Furthermore, in the event a user forgets or misplaces his or her ring size or shoe size, the user will generally have to commute to a retail establishment to have his or her finger or feet re-sized by the physical sizing device. Additionally, alternate methods of obtaining a ring size or shoe size are inaccurate (e.g., tying a string around a finger, enclosing a finger with a piece of tape, measuring foot length with a ruler, etc.). According to various aspects of the present disclosure, the present system and methods eliminate the need for an in-person measurement of an object (e.g., finger, feet, etc.) thus obviating the friction and inconvenience of a user having to travel to a physical location to obtain the measurement.

In various embodiments, the present systems and methods include a computing device operable to display graphical information. In one or more embodiments, the computing device may include tablet computers (e.g., iPads®), smartphones, desktop computers, or any appropriate device capable of displaying visual information on a screen and receiving user input. In particular embodiments, the systems and methods disclosed herein may include software executed on the computing device to facilitate ring-size and/or shoe-size generation.

In one embodiment, the computing device and the software interact to generate and display a standardized profile of an object outline (or silhouette) to facilitate object measurement. In certain embodiments, the standardized profile of an object outline may be displayed on a wall or other flat surface using a projection mechanism. In particular embodiments, the object outline may be a finger outline to facilitate ring size generation. In particular embodiments, the silhouette or the standardized finger outline may be resized to visually match the dimensions of a user's actual finger as placed on the computing device screen display. In various embodiments, the size of the standardized finger outline after resizing to match the size of the user's actual finger may be used to compute the user's ring size.

In another embodiment, the camera of the computing device may be used to compute the object measurement (e.g., user's ring size). In particular embodiments an image of the object is captured using the camera, whereby the size of the object may be generated using the captured image.

In particular embodiments, object measurement may be facilitated using sensor technology. In various embodiments, the length of an object (e.g., foot) may be determined using a depth sensor. In one embodiment, sensor technology is used to scan the object such that a three-dimensional (or two-dimensional) map of the object may be created, and the size of the object (e.g., finger, foot, etc.) is generated using the three-dimensional rendering. In another embodiment, heat sensors are used to generate a screen imprint of the object to be measured, such that the object size may be determined from the screen imprint. In yet another embodiment, an object outline is generated using light sensors. In these embodiments (and others), the object outline (or silhouette) is used to facilitate the object measurement.

According to a particular embodiment, the present systems and methods include an operable connection to online retailers. In various embodiments, the online retailers may include any retailer that partakes in the sale of rings. In some embodiments, the present systems and methods may automatically populate an online retailer's order form with a user's computed ring size to expedite a ring ordering process.

According to particular embodiments, the present disclosure generally describes a method for automatically sizing a physical object via an electronic computing device, including the steps of: displaying a silhouette of an anticipated physical object on a graphical user interface (GUI) of the electronic computing device; receiving input at the electronic computing device corresponding to the silhouette, wherein the input results in a display of an updated silhouette of the anticipated physical object such that the updated silhouette substantially matches the physical object, the updated silhouette having a pixel dimension; retrieving a pixel ratio corresponding to the GUI of the electronic computing device; and calculating an attribute of the physical object based on the pixel dimension and the pixel ratio.

In particular embodiments, the present disclosure describes the method herein, wherein the input includes user interaction with the GUI to increase or decrease the size of the silhouette. In one or more embodiments, aspects of the present disclosure generally describe the method herein, wherein the input includes instructions to modify a size or shape of the silhouette. In some embodiments, the present disclosure describes the method herein, wherein the input includes voice commands or gestures. Generally, in at least one embodiment, the present disclosure describes the method herein, wherein the pixel ratio includes the number of pixels per inch of the GUI. In particular embodiments, the present disclosure describes the method herein, wherein the attribute includes a diameter of the physical object. In various embodiments, aspects of the present disclosure generally describe the method herein, wherein the physical object includes a human finger. In one or more embodiments, the present disclosure describes the method herein, wherein the attribute includes a width of the human finger. In certain embodiments, the present disclosure describes the method herein, further including the step of determining a ring size of the human finger by comparing the width of the human finger to a known table of ring sizes affiliated with diameter ranges. In at least one embodiment, the present disclosure describes the method herein, further including the steps of: initiating a connection to an e-commerce platform; transmitting the ring size via the connection to the e-commerce platform; and initiating an order of a ring based on the ring size.

According to various embodiments, the present disclosure generally describes a system for automatically sizing a physical object, including: a database that stores pixel ratios for electronic computing devices; and an electronic computing device in operative communication with the database, the electronic computing device having a processor operative to: display a silhouette of an anticipated physical object on a graphical user interface (GUI) of the electronic computing device; receive input at the electronic computing device corresponding to the silhouette, wherein the input results in a display of an updated silhouette of the anticipated physical object such that the updated silhouette substantially matches the physical object, the updated silhouette having a pixel dimension; retrieve a pixel ratio corresponding to the GUI of the electronic computing device from the database; and calculate an attribute of the physical object based on the pixel dimension and the pixel ratio.

In particular embodiments, the present disclosure describes the system herein, wherein the input includes user interaction with the GUI to increase or decrease the size of the silhouette. Aspects of the present disclosure generally describe the system herein, wherein the input includes instructions to modify a size or shape of the silhouette. In at least one embodiment, the present disclosure describes the system herein, wherein the input includes voice commands or gestures. In certain embodiments, the present disclosure describes the system herein, wherein the pixel ratio includes the number of pixels per inch of the GUI. Generally, in at least one embodiment, the present disclosure describes the system herein, wherein the attribute includes a diameter of the physical object. In various embodiments, the present disclosure describes the system herein, wherein the physical object includes a human finger. In one or more embodiments, the present disclosure describes the system herein, wherein the attribute includes a width of the human finger. In some embodiments, the present disclosure describes the system herein, wherein the processor is further operative to determine a ring size of the human finger by comparing the width of the human finger to a known table of ring sizes affiliated with diameter ranges. In at least one embodiment, the present disclosure describes the system herein, wherein the processor is further operative to: initiate a connection to an e-commerce platform; transmit the ring size via the connection to the e-commerce platform; and initiate an order of a ring based on the ring size.

According to various embodiments, the present disclosure generally describes a mobile device for automatically sizing a physical object, including: a processor operable on the mobile device, the processor operative to: display a silhouette of an anticipated physical object on a graphical user interface (GUI) of the mobile device; receive input at the mobile device corresponding to the silhouette, wherein the input results in a display of an updated silhouette of the anticipated physical object such that the updated silhouette substantially matches the physical object, the updated silhouette having a pixel dimension; retrieve a pixel ratio corresponding to the GUI of the mobile device; and calculate an attribute of the physical object based on the pixel dimension and the pixel ratio.

According to particular embodiments, the present disclosure generally describes a method for automatically sizing a physical object via an electronic computing device, including the steps of: receiving an indication that the physical object is within a field of view of a sensor of the electronic computing device; identifying, via the sensor, a depth of the physical object from the sensor of the electronic computing device; determining, via the electronic computing device, an image of the physical object, wherein the image has an outline defining an outer boundary of the physical object; determining from the outer boundary of the physical object, a first end and a second end of the physical object; retrieving a pixel ratio corresponding to resolution of the image from the electronic computing device; determining a pixel length between the first end and the second end of the physical object; and based on the depth, the pixel ratio, and the pixel length, calculating a physical length of the physical object.

In particular embodiments, the present disclosure describes the method herein, wherein the sensor of the electronic computing device includes an infrared sensor. In one or more embodiments, aspects of the present disclosure generally describe the method herein, further including the step of prior to receiving the indication that the physical object is within the field of view of the sensor of the electronic computing device, detecting that the electronic computing device is generally aligned with a horizontal surface. In some embodiments, the present disclosure describes the method herein, further including the step of prior to identifying the depth of the physical object from the sensor, detecting that a bottom surface of the physical object is substantially parallel to the camera of the electronic computing device. In certain embodiments, the present disclosure describes the method herein, wherein the depth of the physical object from the sensor is determined according to an average depth of the bottom surface of the physical object. In various embodiments, the present disclosure describes the method herein, wherein the step of determining the image of the physical object further includes using image recognition via machine learning based on stored images of prior objects. Generally, in at least one embodiment, the present disclosure describes the method herein, wherein the step of determining the image of the physical object further includes the steps of: identifying a pixel depth for each pixel associated with the field of view of the sensor; identifying a smallest pixel depth; identifying a subset of pixels in the field of view that are within a predefined threshold measure of the smallest pixel depth; and defining the subset of pixels as the image of the physical object. In particular embodiments, the present disclosure describes the method herein, further including the step of prior to determining the pixel length between the first end and the second end of the physical object, determining an angle of inclination of the physical object with respect to a longitudinal axis of the electronic computing device. In one or more embodiments, the present disclosure describes the method herein, wherein the step of determining the pixel length between the first end and the second end further includes using a trigonometric function to calculate the pixel length based on the angle of inclination. In certain embodiments, the present disclosure describes the method herein, wherein the physical object includes a human foot. In at least one embodiment, the present disclosure describes the method herein, wherein the physical length of the human foot is compared to a shoe size chart to identify a shoe size of a user associated with the human foot.

According to various embodiments, the present disclosure generally describes a system for automatically sizing a physical object, including: a database configured to store pixel ratios for electronic computing devices; and an electronic computing device in operative communication with the database, the electronic computing device having a processor operative to: receive an indication that the physical object is within a field of view of a sensor of the electronic computing device; identify, via the sensor, a depth of the physical object from the sensor of the electronic computing device; determine an image of the physical object, wherein the image has an outline defining an outer boundary of the physical object; determine from the outer boundary of the physical object a first end and a second end of the physical object; retrieve a pixel ratio corresponding to the camera resolution from the electronic computing device from the database; determine a pixel length between the first end and the second end of the physical object; and based on the depth, the pixel ratio, and the pixel length, calculate a physical length of the physical object.

In particular embodiments, the present disclosure describes the system herein, wherein the sensor of the electronic computing device includes an infrared sensor. Aspects of the present disclosure generally describe the system herein, wherein the processor is further operative to, prior to receiving the indication that the physical object is within the field of view of the sensor of the electronic computing device, detect that the electronic computing device is generally aligned with a horizontal surface. In one or more embodiments, the present disclosure describes the system herein, wherein the processor is further operative to, prior to identifying the depth of the physical object from the sensor, detect that a bottom surface of the physical object is substantially parallel to the camera of the electronic computing device. In certain embodiments, the present disclosure describes the system herein, wherein the depth of the physical object from the sensor is determined according to an average depth of the bottom surface of the physical object. In at least one embodiment, the present disclosure describes the system herein, wherein determining the image of the physical object further includes using image recognition via machine learning based on stored images of prior objects. In some embodiments, the present disclosure describes the system herein, wherein the processor is further operative to, with respect to determining the image of the physical object: identify a pixel depth for each pixel associated with the field of view of the sensor; identify a smallest pixel depth; identify a subset of pixels in the field of view that are within a predefined threshold measure of the smallest pixel depth; and define the subset of pixels as the image of the physical object. In various embodiments, the present disclosure describes the system herein, wherein the processor is further operative to, prior to determining the pixel length between the first end and the second end of the physical object, determine an angle of inclination of the physical object with respect to a longitudinal axis of the electronic computing device. Generally, in at least one embodiment, the present disclosure describes the system herein, wherein determining the pixel length between the first end and the second end further includes using a trigonometric function to calculate the pixel length based on the angle of inclination. In one or more embodiments, the present disclosure describes the system herein, wherein the physical object includes a human foot. In particular embodiments, the present disclosure describes the system herein, wherein the physical length of the human foot is compared to a shoe size chart to identify a shoe size of a user associated with the human foot.

These and other aspects, features, and benefits of the claimed system will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system environment, according to one embodiment of the present disclosure.

FIG. 2 illustrates an exemplary flowchart of an exemplary finger sizing process, according to one embodiment of the present disclosure.

FIG. 3 illustrates an exemplary flowchart of an exemplary e-commerce ring purchasing process, according to one embodiment of the present disclosure.

DETAILED DESCRIPTION

Figure 4A:
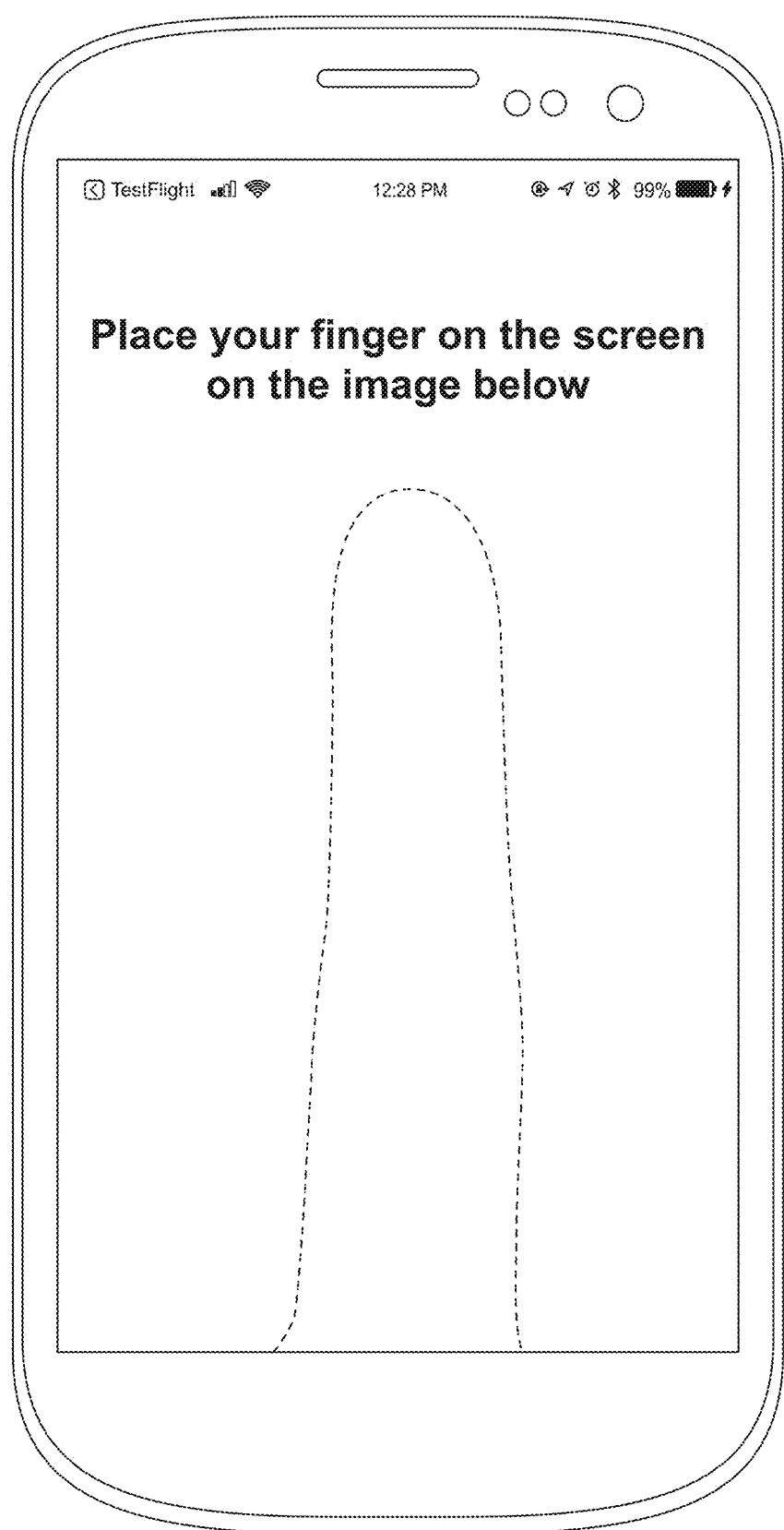
FIG. 4 (including FIGS. 4A-4D) illustrates exemplary screen displays of an exemplary finger sizing process, according to one embodiment of the present disclosure.
Figure 4B:
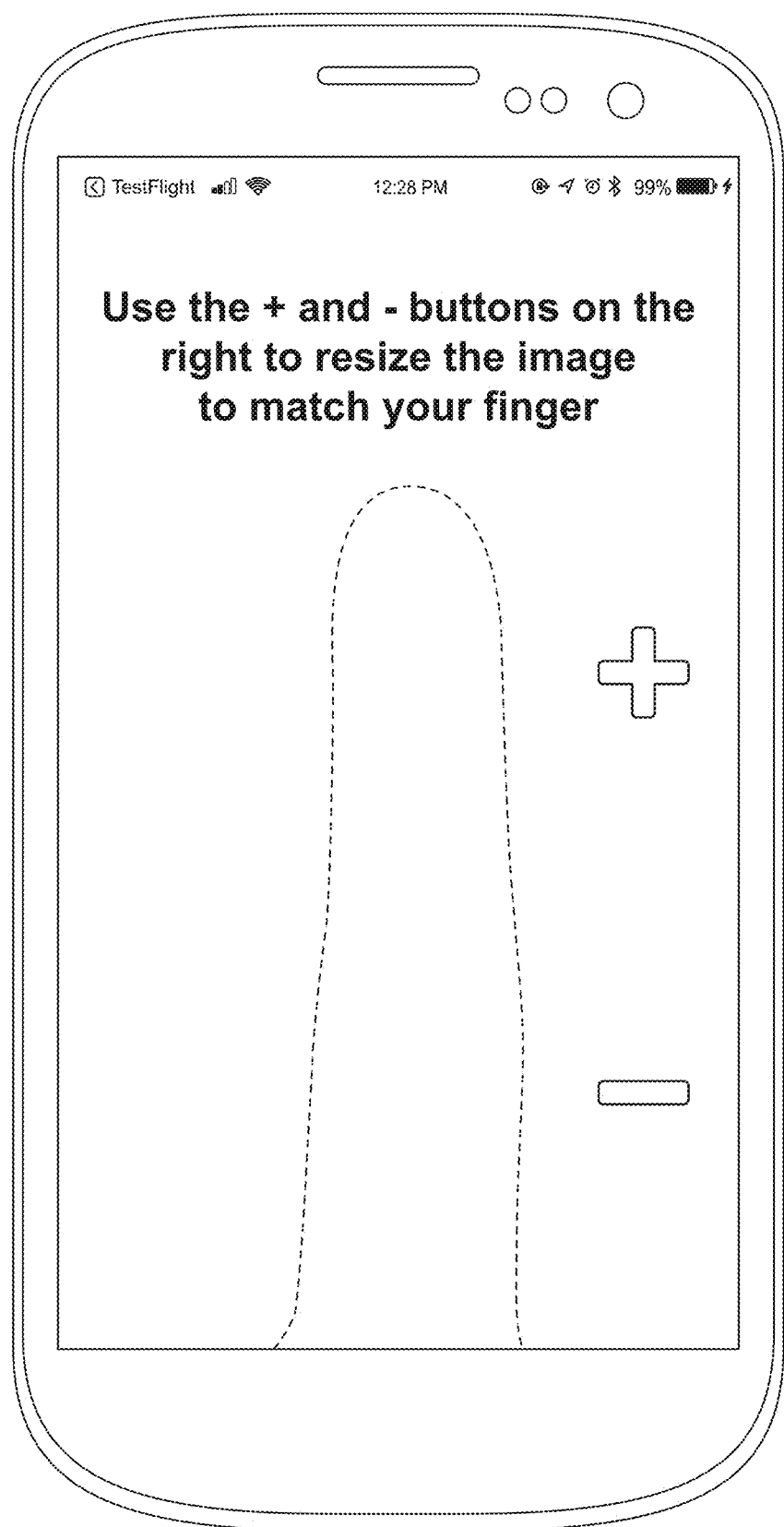
Figure 4C:
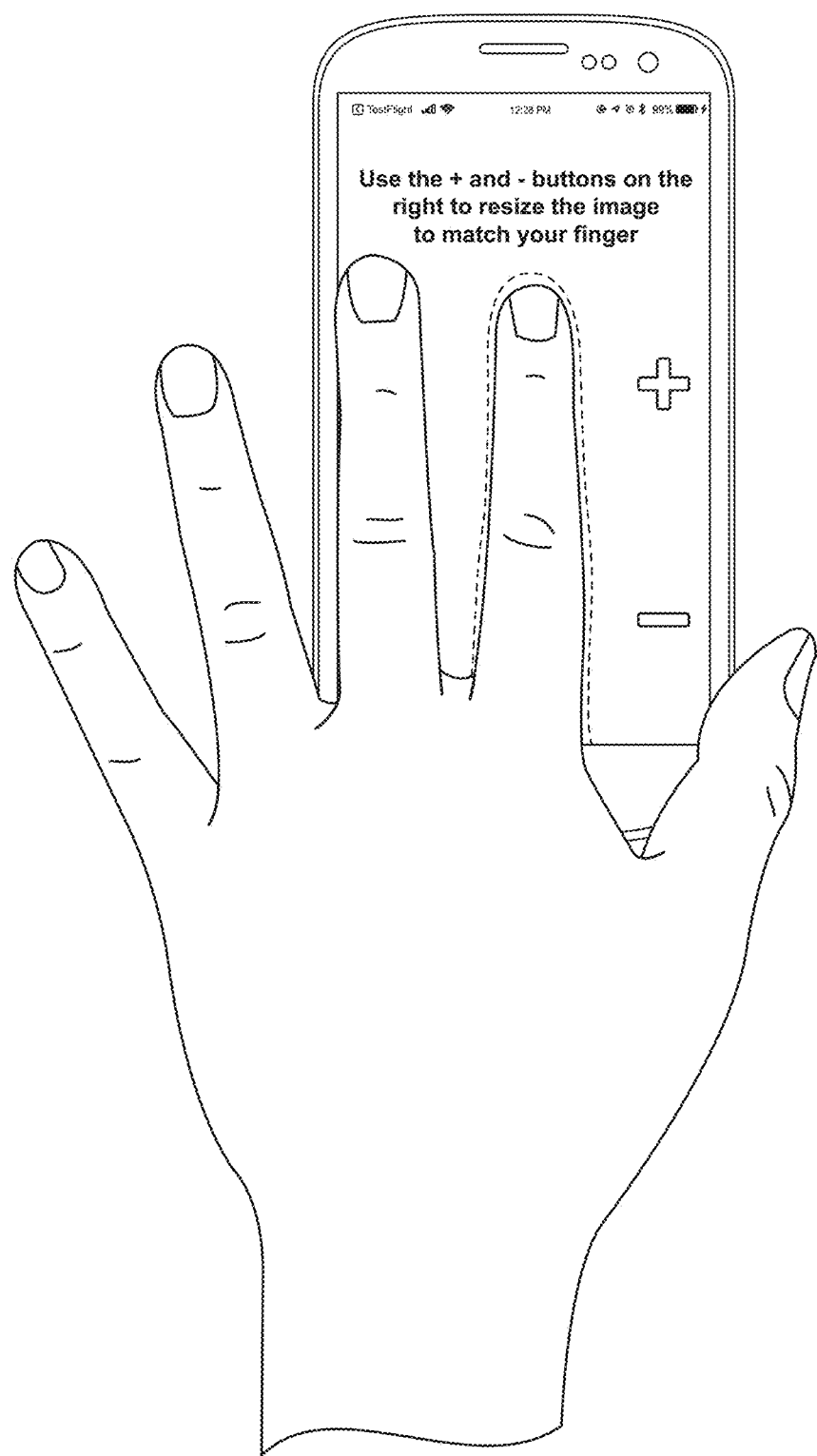
Figure 4D:

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

According to various aspects of the present disclosure, and in one embodiment, the present systems and methods allow for a user to obtain the measurement of an object that is capable of being rested on the screen display of a computing device (e.g., a pencil, a watch band, a bolt, etc.). In another embodiment, the present systems and methods allow for a user to obtain the measurement of an object that is capable of hovering above the camera system of a computing device (e.g., a book, a box, etc.). In one embodiment, the object for measurement may be a user's finger for the purpose of generating a ring size. In another embodiment, the object for measurement may be a user's foot for the purpose of generating a shoe size. Traditionally, ring sizes and shoe sizes are obtained by engaging with a physical device, such that a measurement can be ascertained and correlated to a ring size or shoe size. In these traditional embodiments, the physical device generally provides limited additional functionality apart from determining ring size and/or shoe size. Furthermore, in the event a user forgets or misplaces his or her ring size or shoe size, the user will generally have to commute to a retail establishment to have his or her finger or feet re-sized by the physical sizing device. Additionally, alternate methods of obtaining a ring size or shoe size are inaccurate (e.g., tying a string around a finger, enclosing a finger with a piece of tape, measuring foot length with a ruler, etc.). According to various aspects of the present disclosure, the present system and methods eliminate the need for an in-person measurement of an object (e.g., finger, feet, etc.) thus obviating the friction and inconvenience of a user having to travel to a physical location to obtain the measurement.

In various embodiments, the present systems and methods include a computing device operable to display graphical information. In one or more embodiments, the computing device may include tablet computers (e.g., iPads®), smartphones, desktop computers, or any appropriate device capable of displaying visual information on a screen and receiving user input. In particular embodiments, the systems and methods disclosed herein may include software executed on the computing device to facilitate ring-size or shoe-size generation.

In one embodiment, the computing device and the software interact to generate and display a standardized profile of an object outline (or silhouette) to facilitate object measurement. In certain embodiments, the standardized profile of an object outline may be displayed on a wall or other flat surface using a projection mechanism. In particular embodiments, the object outline may be a finger outline to facilitate ring size generation. In particular embodiments, the silhouette or the standardized finger outline may be resized to visually match the dimensions of a user's actual finger as placed on the computing device screen display. In various embodiments, the size of the standardized finger outline after resizing to match the size of the user's actual finger may be used to compute the user's ring size.

In another embodiment, the camera of the computing device may be used to compute the object measurement (e.g., user's ring size). In particular embodiments an image of the object is captured using the camera, whereby the size of the object may be generated using the captured image.

In particular embodiments, object measurement may be facilitated using sensor technology. In various embodiments, the length of an object (e.g., foot) may be determined using a depth sensor. In one embodiment, sensor technology is used to scan the object such that a three-dimensional (or two-dimensional) map of the object may be created, and the size of the object (e.g., finger) is generated using the three-dimensional rendering. In another embodiment, heat sensors are used to generate a screen imprint of the object to be measured, such that the object size may be determined from the screen imprint. In yet another embodiment, an object outline is generated using light sensors. In these embodiments (and others), the object outline (or silhouette) is used to facilitate the object measurement.

According to a particular embodiment, the present systems and methods include an operable connection to online retailers. In various embodiments, the online retailers may include any retailer that partakes in the sale of rings. In some embodiments, the present systems and methods may automatically populate an online retailer's order form with a user's computed ring size to expedite a ring ordering process.

Exemplary Embodiments

Referring now to the figures, for the purposes of example and explanation of the fundamental processes and components of the disclosed systems and methods, reference is made to FIG. 1, which illustrates an exemplary, high-level overview 100 of one embodiment of the systems and methods herein. As will be understood and appreciated, the exemplary, high-level overview 100 shown in FIG. 1 represents merely one approach or embodiment of the present system, and other aspects are used according to various embodiments of the present system. In particular, FIG. 1 depicts a particular example in which a user 102 seeks to obtain the ring size of one of his or her fingers, and purchase a ring from an online retailer 110 by using an application on his or her computing device 104. Further, FIG. 1 depicts how various systems in this environment interact in at least one embodiment of the systems and methods described herein.

As shown in FIG. 1, a user 102 accesses a computing device 104 for the purpose of obtaining the ring size of one of his or her fingers, whereby he or she may purchase a ring from an online retailer 110 (e.g., jeweler, department store, etc.). In various embodiments, the use may access the computing device to obtain the measurement of his or her feet. In some embodiments, the user may access the computing device to obtain the measurement of, and place an order for, a variety of objects (e.g., a bracelet, a toy, a marker, etc.). In various embodiments, the computing device may be a tablet computer (e.g., iPad®), smartphone, desktop computer, or other like device. In one or more embodiments, the computing device is operatively connected to the online retailer via one or more networks 108.

In one embodiment, the network 108 may be, but is not limited to the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hosts, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

Assume, as a discussion example, that the user 102 is a graduating high school senior and is in the market for a senior class ring to be placed on the ring finger of his right hand. Rather than travel to a local jewelry store, the user seeks to make his purchase online from an online retailer 110. As such, the user engages his mobile phone (e.g., computing device 104) and executes a finger-sizing application ("application") (the application may be web-based, native, hybrid, etc.). Following the instructions of the application, as shown on his screen display 105, the user selects his desired hand and finger to be sized, then places his respective ring finger on the mobile phone screen display, such that it is on or within the finger outline (or silhouette) 107 displayed on the screen. With his opposite hand, the user 102 then presses plus and/or minus buttons located on the screen display 105, to resize the finger outline until it matches an attribute (e.g., the width) of his ring finger. Next, the user presses the "Calculate" button, and the ring size of his ring finger will be calculated and displayed on the screen of his mobile phone (e.g., computing device 104).

Continuing with the present example, once the user's 102 ring size has been generated, the user may press a "Shop for Rings Now" button, and is subsequently prompted to select a type of ring. The user then selects "Class Rings" from a list of available options, and an aggregated list of class rings from all participating retailers is displayed (a participating retailer is a retailer that has agreed to allow the application access to its inventory). The user chooses his desired ring, and the application automatically populates his ring size in the order form. The user then completes the outstanding information in the order form (e.g., name, address, telephone number, payment information, etc.) and clicks on the "Purchase" button to complete his order.

As will be understood from the discussions herein, the above particular example is merely exemplary functionality of the systems and methods described herein. For example, the above describes a user obtaining the ring size of his right ring finger for the purposes of obtaining a class ring, but the systems and methods herein may be useful for any use in connection with measuring an object by placing the object on the screen of a computing device 104. Alternate examples may include a user seeking to obtain the size of a necklace for the purposes of ordering another necklace of the same size; or a user desiring to obtain the measurements of his or her hand for the purposes of ordering winter gloves; or even a user seeking to measure the inner diameter of a baseball cap for the purposes of determining his or her hat size. The above mentioned alternate examples are merely exemplary functionality and are not meant to limit the scope of this disclosure.

Turning now to FIG. 2, an exemplary flowchart of an exemplary finger-sizing process 200 is shown, according to one embodiment of the present disclosure. In particular embodiments, a user that may not know his or her ring size but is seeking to purchase a ring may initiate the exemplary finger-sizing process. As will be understood by a person having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

In one embodiment, and as shown in FIG. 2, the exemplary process 200 begins with step 202, where the system is configured to load the application (the application may be web-based, native, hybrid, etc.). In various embodiments, the application may load upon receiving a user initiated command requesting that the application load. In one or more embodiments, the application may load automatically when a user is engaged in the ring purchasing process and is prompted to enter a ring size on an order form.

At step 204, the system displays an application interface. In particular embodiments, the application interface may include an object, e.g., finger outline (or silhouette) to serve as a guideline for a user's finger or other object to be measured. In various embodiments, the finger outline may initially appear with a predetermined pixel width (e.g., 100 pixels, 150 pixels, 250 pixels, etc.). In some embodiments, plus and minus buttons, or any other suitable sizing mechanism (e.g., sliders, voice commands, etc.) may be included in the application interface whereby a user can increase or decrease the width of the finger outline (or silhouette) by one pixel at a time. In one or more embodiments, the application interface may include object measurement options that can alter the appearance of the finger outline displayed (e.g., hand selection options, finger selection options, etc.). In various embodiments, the application interface may include a button (e.g., "calculate," "submit," "done," etc.) that a user can press to calculate and display his or her ring size.

Turning now to step 206, the system receives an object to be sized from a user. In particular embodiments, the object is received when a user places it on top of the screen displaying the application interface, such that the object is on or within the object, e.g., finger outline. In one or more embodiments, the object may be received by any suitable method (e.g., hovered over the screen, repeatedly placed and removed from the screen such that the object outline can be adjusted between placements, etc.). In one embodiment, the object received may be a user's finger. In various embodiments, the object received may be any suitable object that can fit within the screen displaying the application interface.

At step 208, the system receives input from a user. In various embodiments, the system may be configured to receive touch input, mouse clicks, or any other suitable form of user input. In particular embodiments, the input received may increase or decrease the width of the finger outline (or silhouette) until the finger outline matches an attribute (e.g., the width) of the user's finger. In these embodiments, if the user touches or clicks on the plus and/or minus buttons on the application interface, the finger outline will increase or decrease by one pixel per user touch/click (e.g., if the predetermined pixel width of the finger outline is 200 pixels, and the user touches the plus button seven times and the minus button three times, the pixel width of the finger outline will increase by seven and then decrease by three, such that the resulting pixel width (i.e., pixel dimension) of the finger outline would be 204 pixels). In one or more embodiments, the input received may indicate a request to generate a ring size.

At step 210, the system is configured to compute a user's ring size using the following formula:

$$\text{Inside Diameter of Ring} = \frac{\text{(resulting pixel width)}}{\text{(pixels per inch of screen display)}} \times 25.4$$

In particular embodiments, the system may compute a user's ring size based on the resulting pixel width of the finger outline (or silhouette) generated in step 208. In one or more embodiments, the resulting pixel width (i.e., pixel dimension) may be generated by a pixel counter or other suitable mechanism. In various embodiments, the resulting pixel width of the finger outline equates to the inside diameter of the user's ring. Initially, in one or more embodiments, the inside diameter of the user's ring (in inches) may be determined by dividing the resulting pixel width of the finger outline by pixel ratio, i.e., the number of pixels per inch ("ppi") on a user's screen (a known specification of a mobile device). In various embodiments, the quotient is then multiplied by 25.4 to convert the inside diameter of the user's ring from inches to millimeters. For example, a finger outline having a resulting pixel width (i.e., pixel dimension) of 204 pixels on a computing device having a pixel ratio of 350 ppi would equate to a ring having an inside diameter of 14.51 mm (204±350×25.4). The inside diameter would then be compared to a ring-size conversion chart to compute the user's ring size. As would be understood by a person having ordinary skill in the art, inside diameter measurements convert to different ring sizes based on country specifications. An example of a ring-size conversion chart in the United States and Canada is as follows:

| Inside Diameter (mm) | Ring Size |
| --- | --- |
| 14.1 | 3 |
| 14.5 | 3.5 |
| 14.9 | 4 |
| 15.3 | 4.5 |
| 15.7 | 5 |
| 16.1 | 5.5 |
| 16.5 | 6 |
| 16.9 | 6.5 |
| 17.3 | 7 |
| 17.7 | 7.5 |
| 18.1 | 8 |
| 18.5 | 8.5 |
| 18.9 | 9 |

In the above example, the user would have a ring size of 3.5 in the United States and Canada.

At step 212, the system is configured to display the user's ring size via the application interface. In various embodiments, the system may also display a button that enables e-commerce options for ring shopping.

Referring now to FIG. 3, an exemplary flowchart of an exemplary e-commerce ring purchasing process 300 is shown, according to one embodiment of the present disclosure. In various embodiments, the exemplary process 300 begins with step 302, in which the system displays an e-commerce menu. In particular embodiments, the e-commerce menu provides users with search options for facilitating a ring purchase (e.g., type of ring, type of band, preferred stone, preferred metal, gender of ring-wearer, etc.).

At step 304, the system is configured to receive input from the user. In various embodiments, the system may receive touch input, mouse clicks, or any other suitable form of user input. In one or more embodiments, the input received corresponds to user selections from the e-commerce menu (e.g., a user may select a white gold wedding band with diamond stones for a female). In particular embodiments, input received may indicate a user's request to begin a ring search.

At step 306, the system is configured to connect to online retailers and display purchase options. In various embodiments, the system may search the online retailers for rings that match the user's preferences based on the user selections made at step 304. In particular embodiments, the system may connect to, and display purchase options from any online retailer that sells rings via an e-commerce platform.

Next, at step 308, the system receives input from the user. In particular embodiments, the system may receive touch input, mouse clicks, or any other suitable form of user input. In some embodiments, the input received indicates the user's desired selection from the list of available purchase options displayed at step 306. Upon receiving a user's desired selection, at step 310, the system is configured to append the user's computed ring size to the online retailer's order form, and submit the order for the user's desired selection.

Turning now to FIG. 4 (including FIGS. 4A-4D), exemplary screen displays of an exemplary object (e.g., finger) sizing process are shown, according to one embodiment of the present disclosure. Generally, FIG. 4A shows one embodiment of the initial application interface that includes the finger outline (or silhouette) 107 and instructions for the user 102 to place his or her finger on the screen display 105 on or within the finger outline. FIG. 4B includes a screen display of the application interface after a user places his or her finger on the finger outline 107, whereby the user is instructed how to resize the finger outline (or silhouette) to match his or her finger. FIG. 4C shows an exemplary screen display that includes a user's hand engaging with the application interface. Finally, FIG. 4D shows an exemplary screen display of the application interface that includes a display of a user's calculated ring size.

ALTERNATE EMBODIMENTS

Alternative embodiments of the system may include features that are, in some respects, similar to the various methods described above. In particular, a variety of object sizing systems and methods using a computing device (e.g., smartphone, tablet, etc.) are contemplated by this disclosure.

Figure 5:
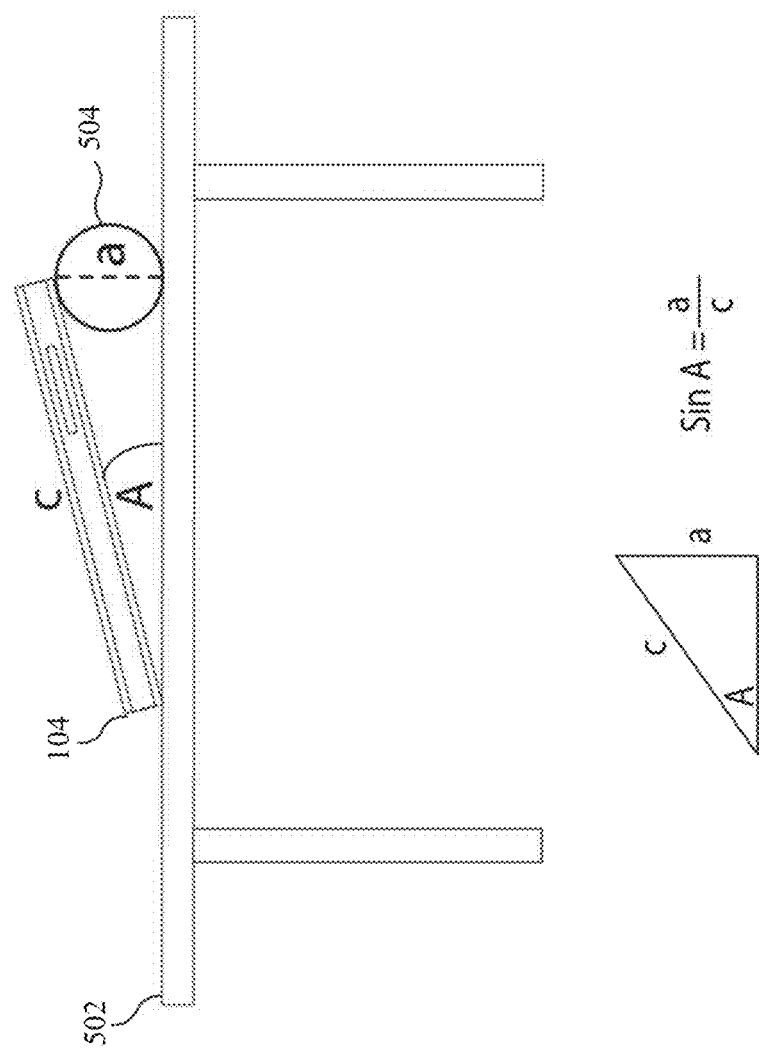
FIG. 5 illustrates an exemplary system environment, according to one embodiment of the present disclosure.

FIG. 5 shows an exemplary system environment 500, according to one embodiment of the present disclosure. In various embodiments, the combination of using the accelerometer and gyroscope in a computing device 104 (e.g., smartphone) may be used to facilitate object measurement. In particular embodiments, an object 504 (e.g., a finger) may be placed on a flat surface 502 underneath a computing device 104 operable to detect angle variations using an accelerometer and/or a gyroscope. In certain embodiments, the screen of the computing device may display instructions providing guidance to a user for placing the object 504. In one embodiment, the object is placed underneath the computing device 104, such that the most distal end of the computing device (from the angle of elevation) rests on top of the object. In one or more embodiments, the system may determine the measure of the angle of elevation (e.g., Angle 'A' as shown in FIG. 5) of the computing device resulting from the object 504 being placed on a flat surface 502 underneath the computing device 104. In at least one embodiment, the system may calculate an attribute (e.g., Height 'a' as shown in FIG. 5) of the object by using the known and/or derived measurements (e.g., measure of the angle of elevation of the computing device, distance from the vertex of the angle of elevation to the object 504, etc.) in a mathematical equation (e.g., the Pythagorean Theorem). In at least one embodiment, the object 504 may be a human finger, whereby the attribute calculated may be used to generate the ring size of the finger as described above in relation to FIG. 2. In another embodiment, the object may be a ring, a card, a toy, or any other suitable object.

Figure 6:
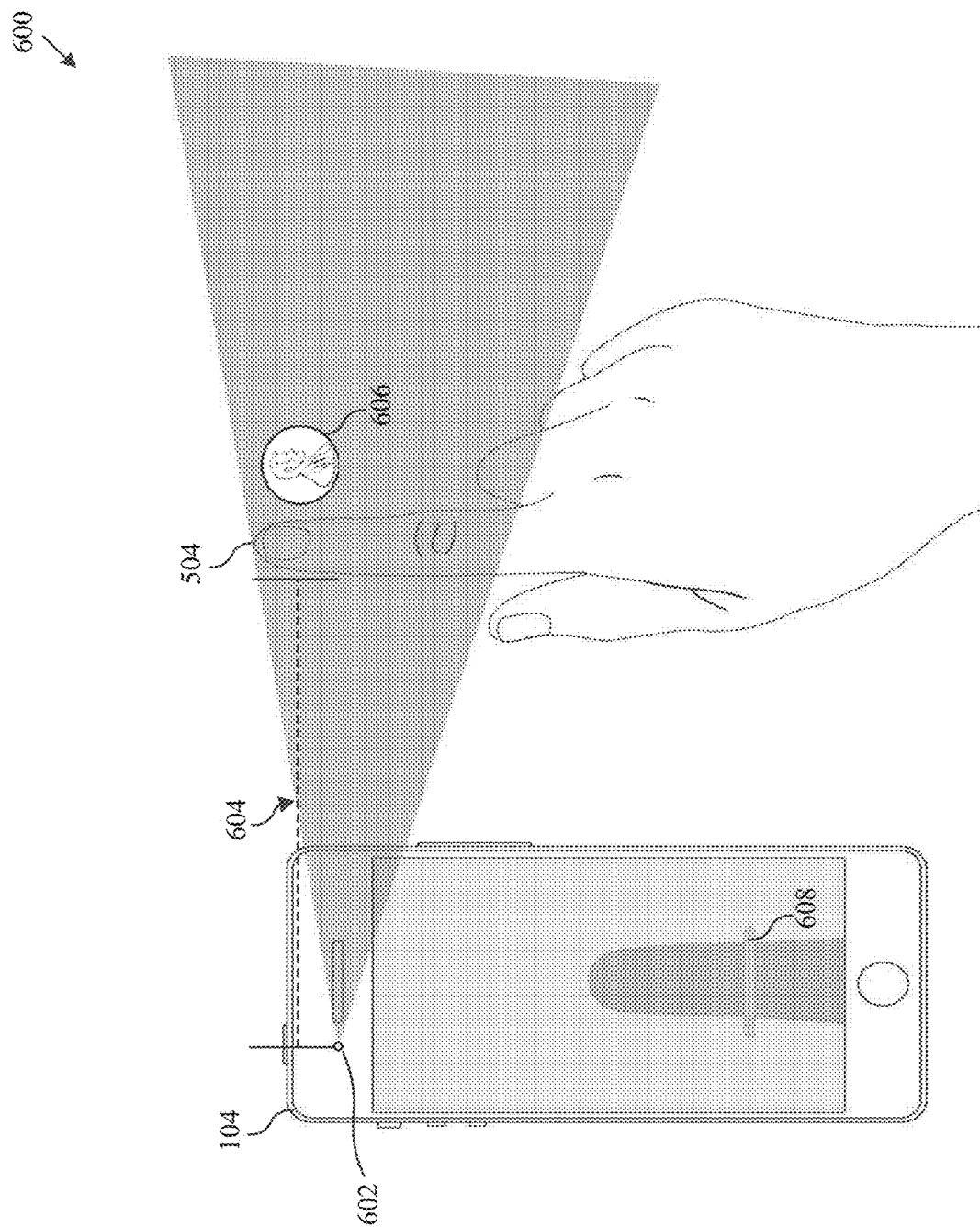
FIG. 6 illustrates an exemplary use case scenario, according to one embodiment of the present disclosure.
Figure 7:
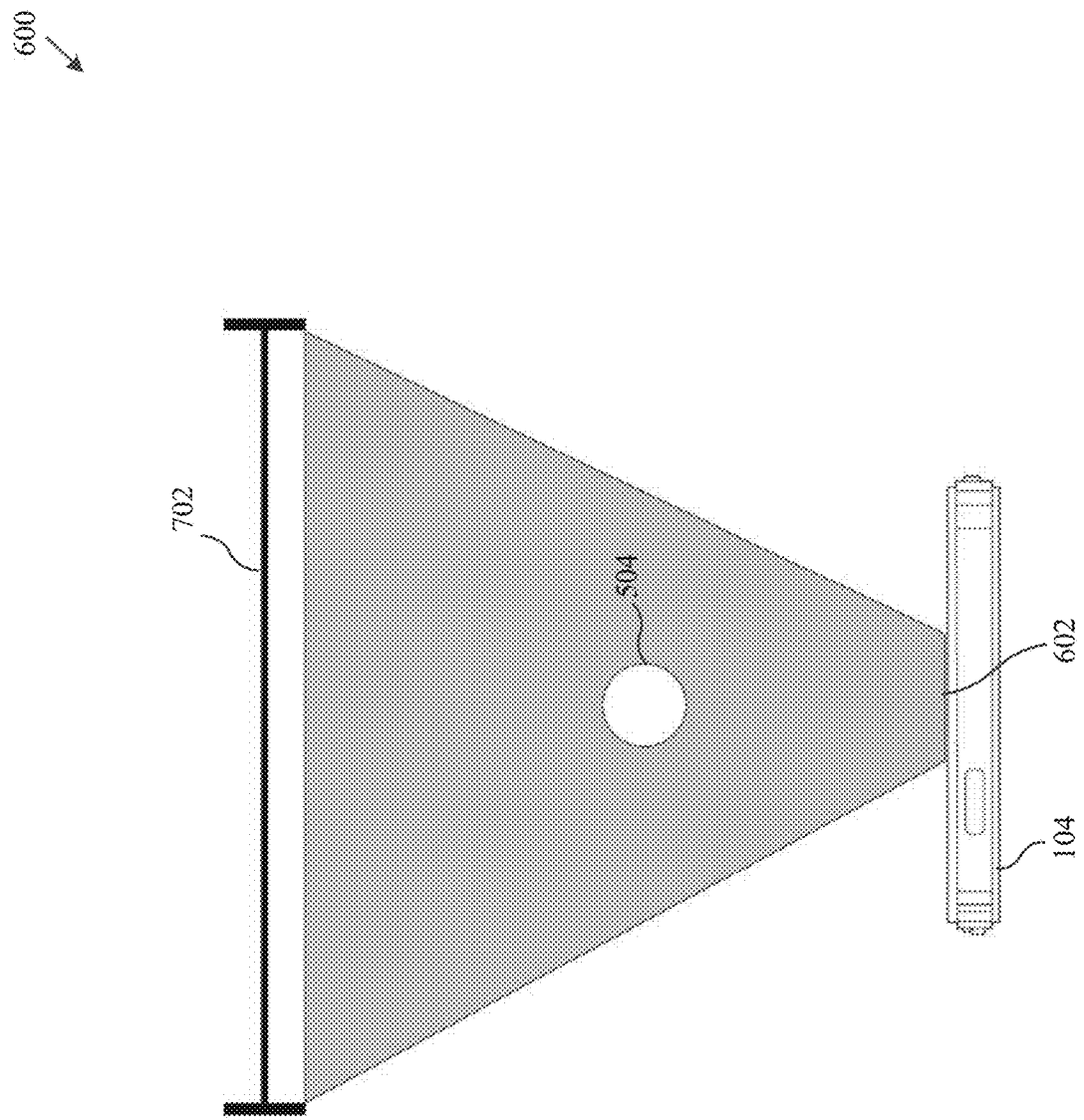
FIG. 7 illustrates an exemplary use case scenario, according to one embodiment of the present disclosure.

Referring now to FIGS. 6 and 7, an exemplary object (e.g., finger) sizing use case 600 is shown, according to one embodiment of the present disclosure. In at least one embodiment, and as shown in FIGS. 6 and 7, the camera 602 of a computing device 104 may be used to facilitate object measurement. In various embodiments, the object 504 (e.g., finger) to be measured is placed in front of the camera and an image of the object is captured. In one or more embodiments, the camera 602 may detect various properties of the object, including but not limited to, the distance 604 from the camera to the object 504. In particular embodiments, the distance from the camera to the object may be generated by placing the object 504 to be measured in close proximity to a reference object 606 (e.g., a penny). In these embodiments (and others), the system may determine the distance of the object to be measured by recognizing the reference object 606 and its known width (or height) and multiplying that known width (or height) by the focal length 702 of the camera (a known value of the computing device's camera). In at least one embodiment, the product of the distance from the camera 602 to the object 504, the pixel width of the object in the image, and the width (or height) of the camera's sensor (a known value of the computing device's camera) is calculated. In these embodiments, an attribute (e.g., the width) of the object 504 (e.g., finger) to be measured is generated by dividing this product by the product of the focal length 702 of the camera 602 (a known value of the computing device's camera) and the total pixel width (or height) of the image of the object captured by the camera. In one embodiment, the pixel width of the object 504 may be calculated by measuring a predetermined position on the object. In these embodiments (and others), the predetermined position of the object may be based on the object's positioning in front of the camera (e.g., position 608). In particular embodiments, the predetermined position of the object 504 may be based on the object's relative position to a reference object 606. In one or more embodiments, the pixel width of the object may be calculated in any suitable manner (e.g., the pixel width at multiple locations on the object may be measured and averaged, etc.). In at least one embodiment, and as shown in FIG. 6, the object 504 may be a human finger, whereby the attribute calculated may be used to generate the ring size of the finger as described above in relation to FIG. 2.

As another example of an alternative embodiment, a projection mechanism may be used to facilitate object measurement. In one or more embodiments, a computing device may be operable to project two lines (or a silhouette of an object) onto a wall or other flat surface, whereby the object to be measured may be positioned between the two projected lines. In various embodiments, the distance between the two projected lines may initially appear with a predetermined pixel width (e.g., 100 pixels, 150 pixels, 250 pixels, etc.). In particular embodiments, the two projected lines may be resized such that the object to be measured is positioned between, and tangential to, the two projected lines. In some embodiments, the resulting pixel width (i.e., pixel dimension) between the two projected lines is determined by the resultant offset of pixels upon resizing the two projected lines (e.g., if the initial predetermined pixel width is 100 pixels and the two projected lines are broadened by 20 pixels and then subsequently narrowed by 10 pixels, then the resulting pixel width would be 110 pixels). In at least one embodiment, an attribute (e.g., the width) of the object to be measured is generated by dividing the resulting pixel width between the two projected lines by pixel ratio, i.e., the number of pixels per inch ("ppi") of the projected image (a known specification of the projection mechanism).

Furthermore, alternative embodiments may include three-dimensional rendering to facilitate object measurement. In various embodiments, a computing device may include sensors to scan the object (e.g., finger) such that a three-dimensional map of the object may be created. In particular embodiments, the sensors used by the computing device may include depth sensors, sonic sensors, multiple cameras, infrared, or any other suitable sensors. In certain embodiments, the object may be held at a particular distance (e.g., six inches, one foot, three feet, etc.) from the sensor. In one or more embodiments, the sensor may measure the environment in front of the computing device, such that spatial reference points may be generated. In a particular embodiment, the object is aligned with each axis of the sensor (e.g., camera). In at least one embodiment, the sensor counts the number of pixels contained in the width of the object (e.g., finger) and measures the distance to each pixel on each axis. In various embodiments, the product of the distance from the sensor to the object, the pixel width of the object in the three-dimensional rendering, and the width (or height) of the sensor (a known value of the sensor) is calculated. In these embodiments, the width of the object (e.g., finger) to be measured is generated by dividing this product by the product of the focal length of the sensor (a known value of the sensor) and the total pixel width (or height) of the three-dimensional rendering.

In yet another example of an alternative embodiment, heat sensing technology may be used to facilitate object measurement. In particular embodiments, a user may place his or her finger (or other object) on the screen of a computing device operable to detect heat. In various embodiments, the heat generated by the user's finger would create an imprint of the user's finger on the screen. In at least one embodiment, the pixel width (i.e., pixel dimension) of the imprint of the user's finger is determined by a pixel counter or other suitable mechanism. In one or more embodiments, the width of the user's finger (or other object) is determined by dividing the pixel width of the imprint of the user's finger by the number of pixels per inch of the computing device's screen (a known specification of the computing device).

Additionally, light sensing technology may be used for object measurement. In particular embodiments, a user's finger (or other object) may be placed on the screen of a computing device operable to detect light. In various embodiments, upon shining a light onto the screen containing the user's finger, the system detects the absence of light on the screen where the user's finger is resting. In one or more embodiments, the width of the area containing the absence of light may be measured to determine the width of the user's finger. In certain embodiments, the pixel width (i.e., pixel dimension) of the area containing the absence of light is determined by a pixel counter or other suitable mechanism. In at least one embodiment, the width of the user's finger (or other object) is determined by dividing the pixel width of the area containing the absence of light by the number of pixels per inch of the computing device's screen (a known specification of the computing device).

Further, alternative embodiments may include object measurement via image recognition. In these embodiments, a front facing sensor (e.g., camera, infrared sensor, etc.) of a user's computing device (e.g., tablet computer, smartphone, desktop computer, etc.) may be used to continuously detect and retrieve the depth (e.g., distance away from the sensor) of an image (e.g., a user's foot). In certain embodiments, the depth is detected and retrieved in real-time as the object moves. In particular embodiments, the system may apply the detected depth to calculate information about the object (e.g., the hypotenuse, the angle of inclination, the slope, etc.). For example, to calculate the object's angle of inclination, the system may apply the formula $x=Ay+B$, where A is the slope and B is the x-intercept (x and y are coordinates relative to the user's computing device display). Continuing with this example, the angle of inclination is equal to the inverse tangent of the slope of the line (variable A). In one or more embodiments, the system may use the information calculated to create a 3D map of the object for display on the user's computing device.

Figure 8:
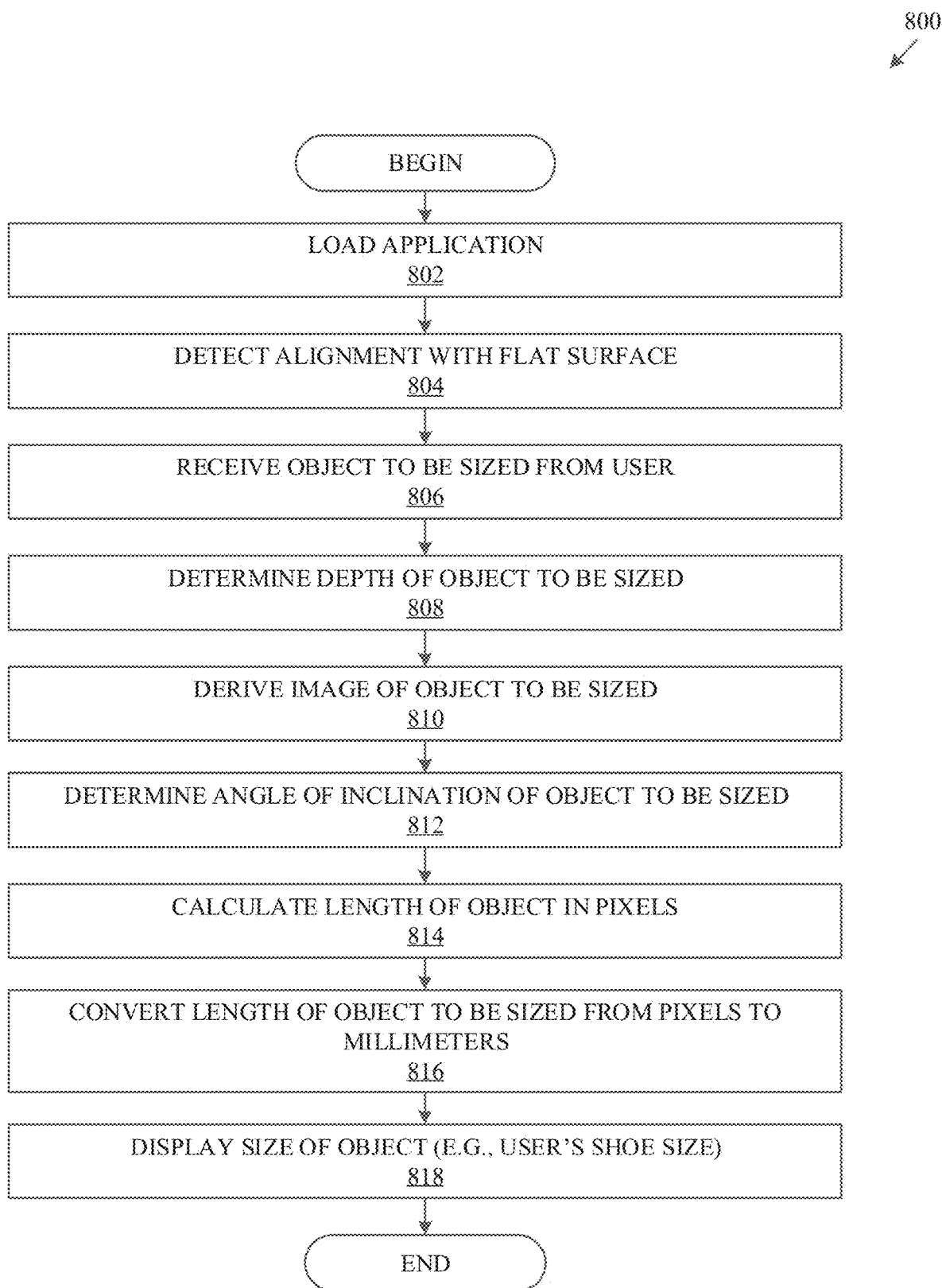
FIG. 8 illustrates an exemplary flowchart of an exemplary foot sizing process, according to one embodiment of the present disclosure.

Turning now to FIG. 8, an exemplary flowchart of an exemplary foot-sizing process 800 is shown, according to one embodiment of the present disclosure. In particular embodiments, a user that may not know his or her shoe size but is seeking to purchase a pair of shoes may initiate the exemplary foot-sizing process. In one embodiment, and as shown in FIG. 8, the exemplary process 800 begins with step 802, where the system is configured to load the application (the application may be web-based, native, hybrid, etc.) on the user's computing device (e.g., smartphone, tablet, etc.). In various embodiments, the application may load upon receiving a user initiated command requesting that the application load. In one or more embodiments, the application may load automatically when a user is engaged in the shoe purchasing process and is prompted to enter a shoe size on an order form.

At step 804, the system detects alignment of the computing device (e.g., smartphone, tablet, etc.) with a flat surface (e.g., floor, table, desk, etc.). In these embodiments (and others), the computing device is aligned with a flat surface to facilitate recognition of the orientation of an object to be sized. In one or more embodiments, the system detects alignment using an accelerometer or other suitable sensor (e.g., gyroscope, magnetometer, etc.).

Turning now to step 806, the system receives an object to be sized from a user. In particular embodiments, the object is received when a user hovers it over the screen displaying the application interface, such that the object is substantially parallel to a computing device (e.g., smartphone, tablet, etc.) and within the field of view of the computing device. In one or more embodiments, the object may be received by any suitable method (e.g., placed on the screen). In one embodiment, the object received may be a user's foot. In various embodiments, the object received may be any suitable object that can fit within the field of view of the sensor of the computing device.

At step 808, the system is configured to determine the depth (e.g., the distance to the computing device) of the object to be sized. In particular embodiments, the system may determine the depth of the object to be sized using a sensor on the computing device (e.g., smartphone, tablet, etc.) that measures the distance from the computing device to the object (e.g., foot), i.e., the depth of the object. In particular embodiments, the sensor may operate using various depth detecting methods (e.g., stereo triangulation, sheet of light triangulation, structured light, time-of-flight, interferometry, coded aperture, etc.). In certain embodiments, the sensor may be a camera, an infrared sensor, a proximity sensor, or any other suitable sensor as will occur to one of ordinary skill in the art.

Figure 10:
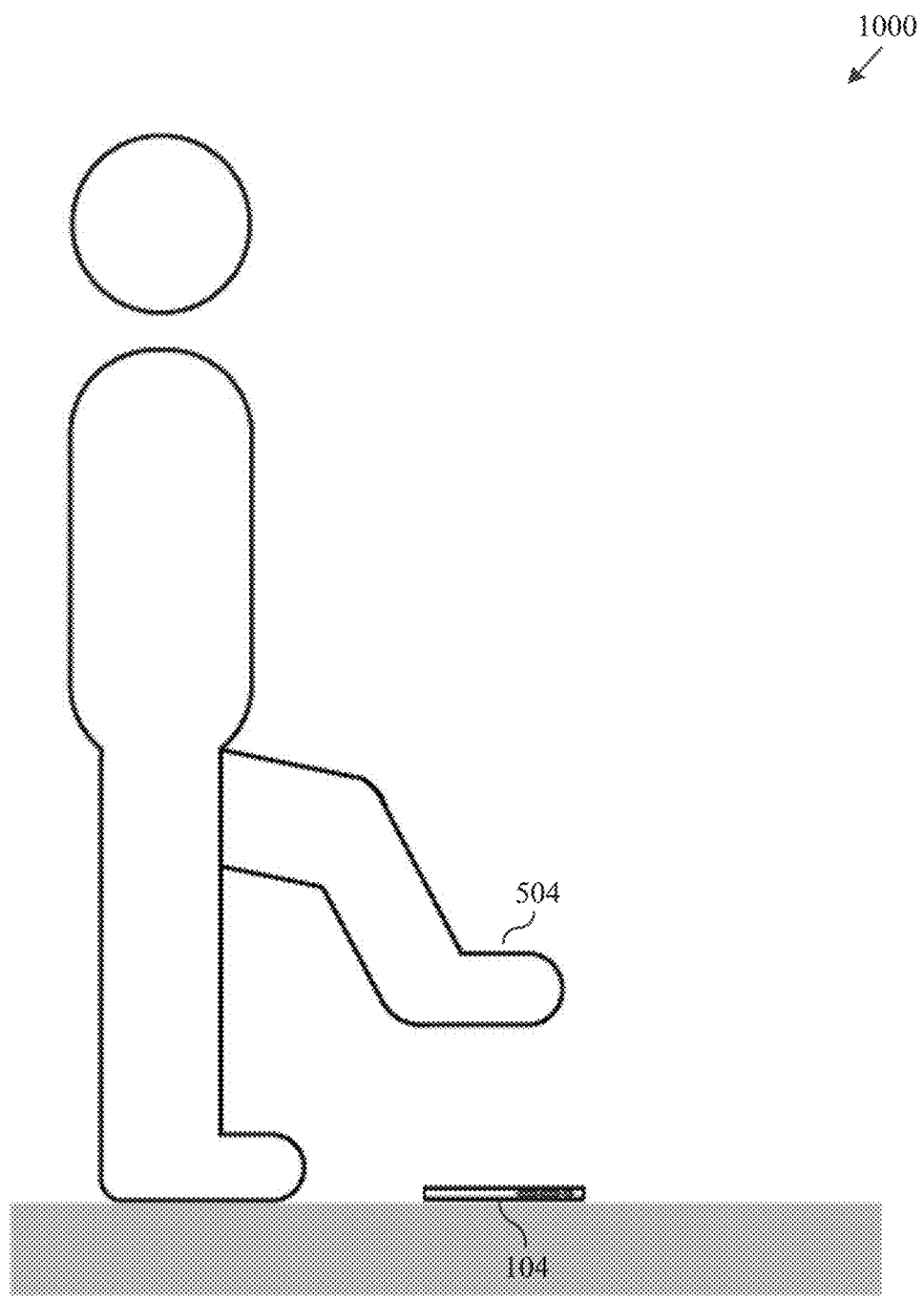
FIG. 10 illustrates an exemplary use case scenario, according to one embodiment of the present disclosure.

In various embodiments, if, at step 804, the system is unable to detect alignment with a flat surface, the exemplary process 800 may continue if the object received is substantially parallel to the computing device as shown and discussed in relation to FIG. 10. In these embodiments (and others), the system is configured to apply the depth data to determine the parallelism of the object. In one embodiment, if the object is not substantially parallel, the system may display a prompt via the application interface to adjust the object. In another embodiment, if the object is not substantially parallel, the system may terminate the process.

Turning now to step 810, the system is configured to derive an image of the object to be sized. In various embodiments, the image of the object is generated using one or more sensors located on the computing device to detect and derive various properties of the object (e.g., distance, height, width, position, etc.). In one embodiment, and as shown and discussed in relation to FIG. 11, the image may be generated by analyzing the depth data to identify which pixels are closest, and then cropping out the distant, i.e., background, pixels such that boundary lines can be drawn around the remaining (e.g., closest) pixels. In another embodiment, the image may be generated using image recognition (e.g., machine learning) to locate the object (e.g., foot) and then crop out the pixels that are not part of the object. In particular embodiments, the image (e.g., silhouette, heat map, etc.) of the object may be displayed on the screen of the computing device. In one or more embodiments, the image of the object may track the movement of the object (e.g., foot) as it hovers above the computing device (e.g., smartphone, tablet, etc.). For example, if the object moves left and right, then the image will simultaneously move left and right. Continuing with this example, if the object moves further away from or closer to the computing device, then the image will simultaneously become smaller and larger respectively.

At step 812, the system determines the angle of inclination of the object to be sized. In certain embodiments, the angle of inclination is determined relative to the longitudinal alignment of the object to the screen (e.g., camera orientation) of the computing device. In one or more embodiments, the angle of inclination may be determined by setting up a Pythagorean model over the object image displayed on the application interface, whereby the hypotenuse is equivalent to the object length. In certain embodiments, the position of the hypotenuse is determined by linear regression (e.g., the hypotenuse is the best fit straight line between the top of the object image (e.g., foot image) and the bottom of the object image). In some embodiments, the system may determine the position of the hypotenuse using various methods (e.g., least squares procedure, quantile regression, etc.). In at least one embodiment, the angle of inclination is obtained by calculating the inverse tangent of the slope of the line using the formula x=Ay+B, where A is the slope and B is the x-intercept (x and y are coordinates relative to the user's computing device display).

Turning now to step 814, the system is configured to calculate the length of the object to be sized in pixels. In various embodiments, upon determining the angle of inclination at step 812, the system calculates the length of the object to be sized in pixels by applying trigonometric ratios, whereby the height of the object to be sized in pixels is obtained from the coordinate system of the camera of the computing device. In these embodiments (and others), the length (e.g., hypotenuse) of the object in pixels may be equal to the object image height divided by the sine of the angle of inclination.

At step 816, the system is configured to convert the length of the object to be sized from pixels to millimeters. In various embodiments, the system may convert the length of the object to be sized from pixels to millimeters using the following formula:

$$length_{mm} = 2\tan\left(\frac{FOV}{2}\right) \times \frac{length_{pixels}}{\text{sensor } height_{pixels}} \times distance_{mm}$$

In particular embodiments, a user's foot size (e.g., shoe size) may be obtained by comparing the length of the user's foot (in mm) to a shoe-size conversion chart. As would be understood by a person having ordinary skill in the art, foot length measurements convert to different shoe sizes based on country specifications, manufacturers, brands, etc. An example of a general shoe-size conversion chart for both men and women in the United States is as follows:

| Men's Sizes | |
| --- | --- |
| Foot Length (mm) | Shoe Size |
| 235 | 6 |
| 241 | 6.5 |
| 244 | 7 |
| 248 | 7.5 |
| 254 | 8 |
| 257 | 8.5 |
| 260 | 9 |
| 267 | 9.5 |
| 270 | 10 |
| 273 | 10.5 |
| 279 | 11 |
| 283 | 11.5 |
| 286 | 12 |
| 294 | 13 |
| 302 | 14 |
| 310 | 15 |
| 318 | 16 |

| Women's Sizes | |
| --- | --- |
| Foot Length (mm) | Shoe Size |
| 208 | 4 |
| 213 | 4.5 |
| 216 | 5 |
| 222 | 5.5 |
| 225 | 6 |
| 230 | 6.5 |
| 235 | 7 |
| 238 | 7.5 |
| 241 | 8 |
| 246 | 8.5 |
| 251 | 9 |
| 254 | 9.5 |
| 259 | 10 |
| 262 | 10.5 |
| 267 | 11 |
| 271 | 11.5 |
| 276 | 12 |

At step 818, the system is configured to display the user's shoe size via the application interface.

Figure 9:
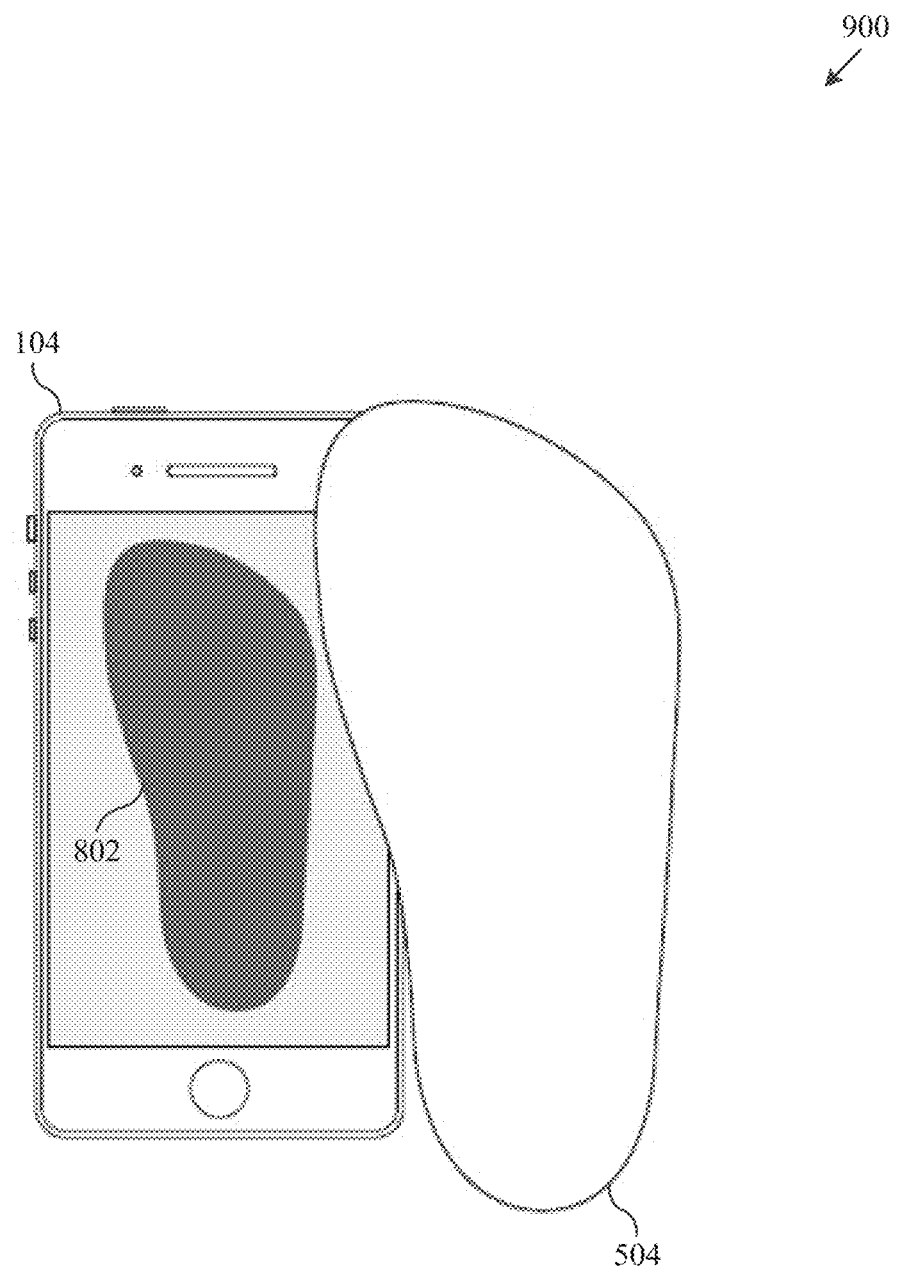
FIG. 9 illustrates an exemplary use case scenario, according to one embodiment of the present disclosure.

Turning now to FIG. 9, an exemplary object (e.g., foot) sizing use case scenario 900 is shown, according to one embodiment of the present disclosure. In at least one embodiment, and as shown in FIG. 9, the object 504 (e.g., foot) to be measured may hover above a computing device (e.g., smartphone, tablet, etc.) 104. In one or more embodiments, the object may hover above the computing device at a distance that allows the object 504 to stay within the field of view ("FOV") of one or more sensors (e.g., camera, infrared sensor, proximity sensor, etc.) located on the computing device. In particular embodiments, and as discussed above, an image (e.g., silhouette, heat map, etc.) 802 of the object may be displayed on the computing device that tracks the movement of the object (e.g., foot) 504 as it hovers above the computing device 104. For example, if the object moves left and right, then the image 802 will simultaneously move left and right. Continuing with this example, if the object moves further away from or closer to the computing device, then the image will simultaneously become smaller and larger respectively. In various embodiments, the image 802 of the object is generated using one or more sensors located on the computing device 104 to detect and derive various properties of the object (e.g., distance, height, width, position, etc.) as discussed below in relation to FIG. 11.

Figure 11:
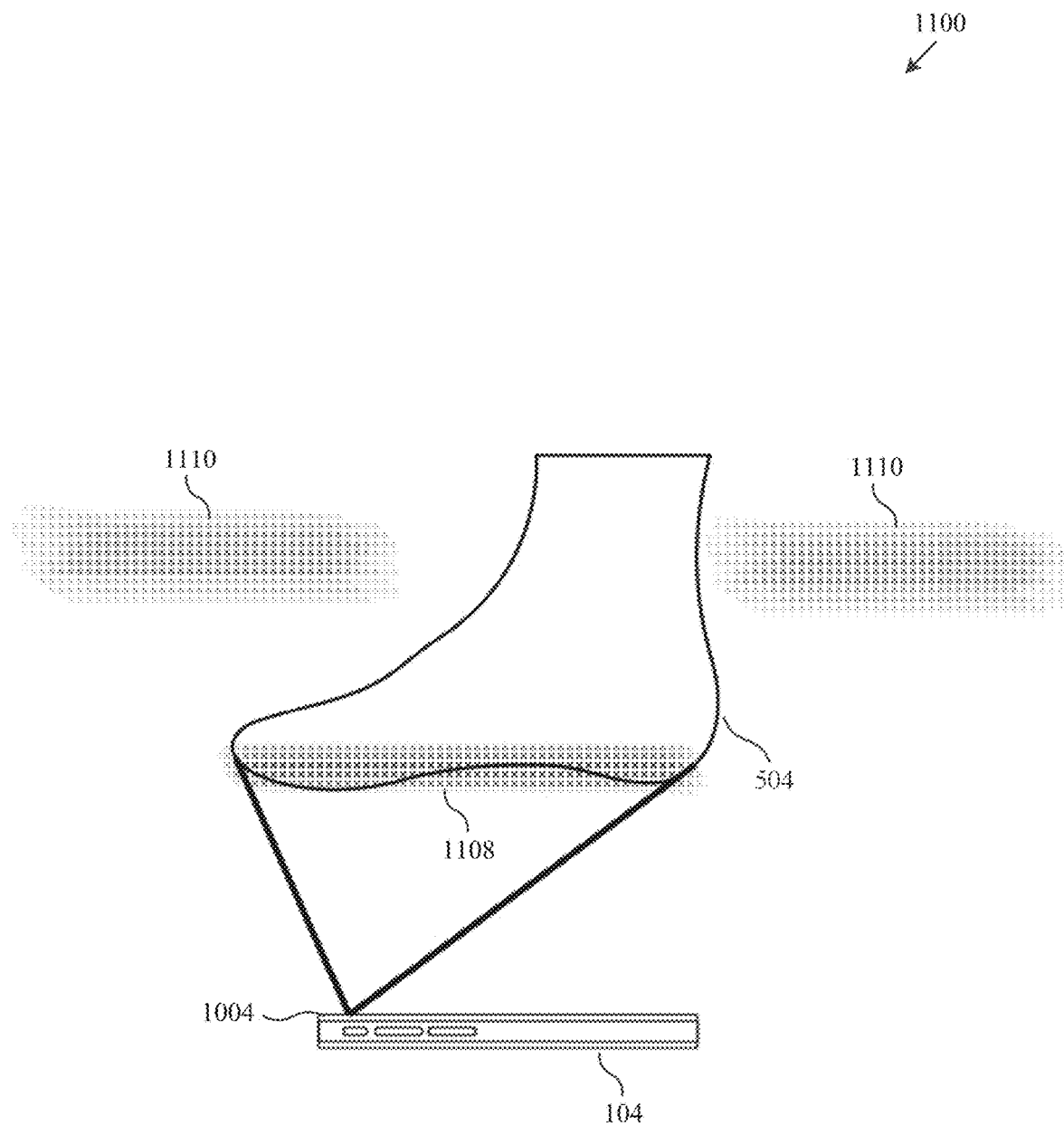
FIG. 11 illustrates an exemplary use case scenario, according to one embodiment of the present disclosure.

FIGS. 10 and 11 show an exemplary object 504 (e.g., foot) sizing use case scenario 1000, according to one embodiment of the present disclosure. In particular embodiments, and as shown in FIG. 10, an object (e.g., foot) may hover above the computing device such that the object is substantially parallel to the computing device 104. In particular embodiments, if the object 504 is not substantially parallel to the computing device (e.g., within one-half of a centimeter, within one centimeter, etc.), the system may display a prompt via the application interface to adjust the object. In one or more embodiments, if the object is not substantially parallel, the system may terminate.

Figure 12:
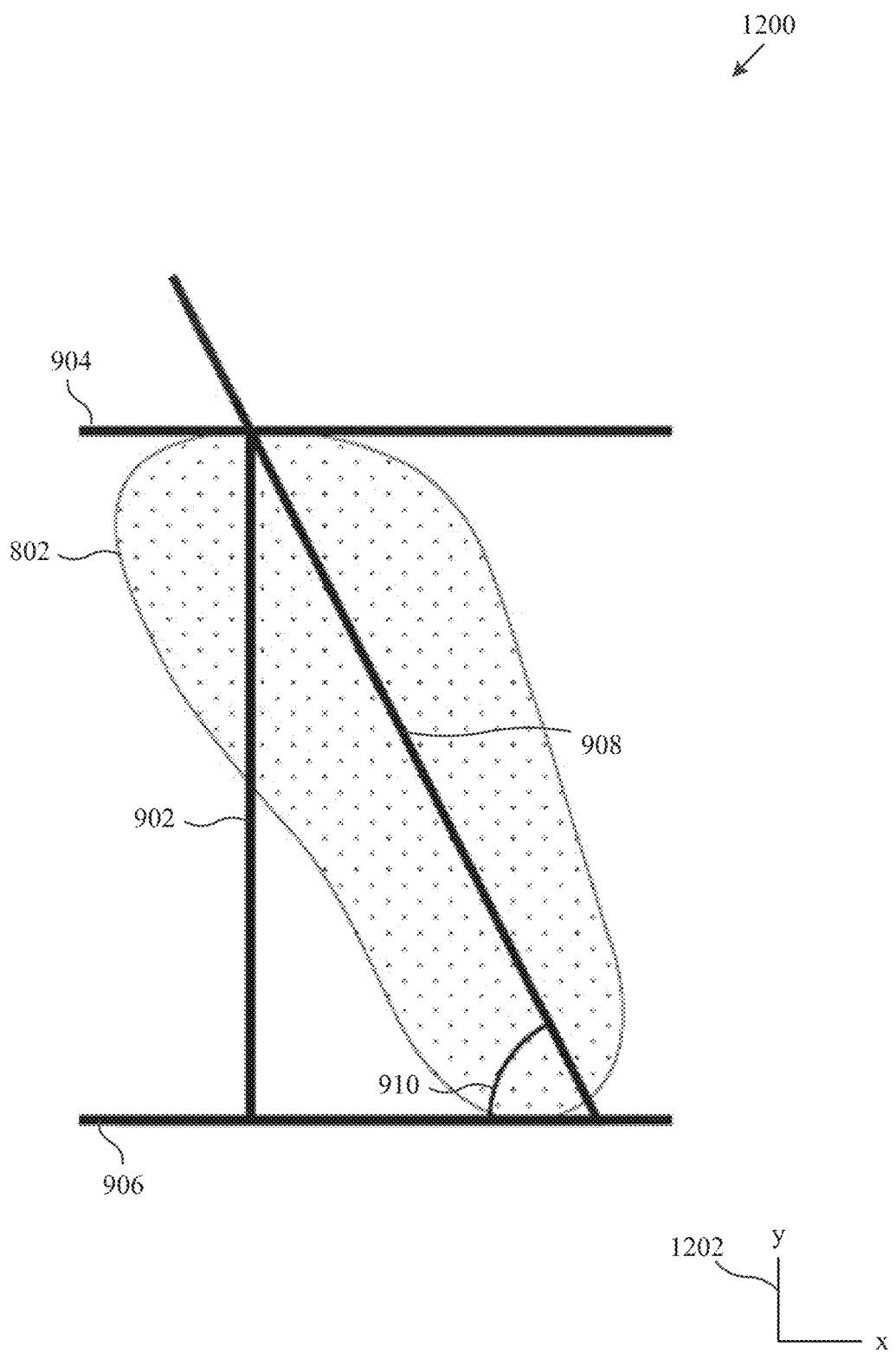
FIG. 12 illustrates an exemplary user interface with overlay, according to one embodiment of the present disclosure.

In various embodiments, and as shown in FIG. 11, the system may include one or more sensors 1004 (e.g., camera, infrared sensors, proximity sensors, etc.) to detect the depth (e.g., the distance to the computing device) of the object 504 (e.g., foot). In particular embodiments, the system may determine the size and shape of the object (in pixels) by analyzing the depth data of the object using one or more known depth-sensing techniques. For example, the system may apply the depth data to generate a two-dimensional image of the object for display on the user interface of a computing device (e.g., smartphone, tablet, etc.). In this example, and as shown in FIG. 12, the system may keep (e.g., display) pixels 1108 that are clustered together at a substantially similar depth, and crop (e.g., delete) pixels 1110 that are outside the range of the pixels 1108 that are clustered together. In various embodiments, the cropped pixels 1110 represent pixels that are further away from the computing device, and the clustered pixels 1108 are generally affiliated with the object.

FIG. 12 shows an exemplary user interface with overlay 1200, according to one embodiment of the present disclosure. In certain embodiments, and as discussed above, the user interface may display on a smartphone, tablet computer, or any appropriate device capable of displaying visual information on a screen. In various embodiments, and as shown in FIG. 12, the exemplary user interface with overlay includes an object image 802 (e.g., foot image) to be measured positioned at an angle of inclination 910 relative to the x-axis (e.g., horizontal axis of a computing device display). In these embodiments (and others), the computing device display may function as a coordinate map, whereby the width of the display is an x-axis and the length of the display is a y-axis 1202. In particular embodiments, the y-axis 1202 is longitudinal relative to the computing device display.

In one or more embodiments, the length of the object is determined by setting up a Pythagorean model over the object image 802 displayed on the user interface, whereby the hypotenuse 908 is equivalent to the object length. In at least one embodiment, the length of the object is obtained in real-time. In certain embodiments, the position of the hypotenuse is determined by linear regression (e.g., the hypotenuse is the best fit straight line between the top of the object image 802 (e.g., foot image) and the bottom of the object image). In some embodiments, the system may determine the position of the hypotenuse using various methods (e.g., least squares procedure, quantile regression, etc.). In various embodiments, the height 902 of the object is determined by retrieving from the computing device (using a depth sensor as described above in relation to FIG. 11), the distance 902 (in pixels) between the base 906 of the object image 802 and the most vertical position 904 of the object image.

In at least one embodiment, and as discussed above, the angle of inclination is obtained by calculating the inverse tangent of the slope of the line using the formula x=Ay+B, where A is the slope and B is the x-intercept (x and y are coordinates relative to the user's computing device display). Upon obtaining the height 902 of the object image 802 (e.g., foot image) and the angle of inclination 910, the hypotenuse (e.g., the object length) is determined by applying trigonometric ratios (e.g., the hypotenuse may be equal to the object image height 902 divided by the sine of the angle of inclination 910. In various embodiments, and as discussed below in relation to FIG. 14, if there is no angle of inclination (e.g., the user's foot is positioned substantially straight relative to the computing device display), the system may calculate the length of the object (e.g., foot) using various properties of the front facing sensor (e.g., camera, infrared sensor, etc.) of the computing device.

Figure 13:
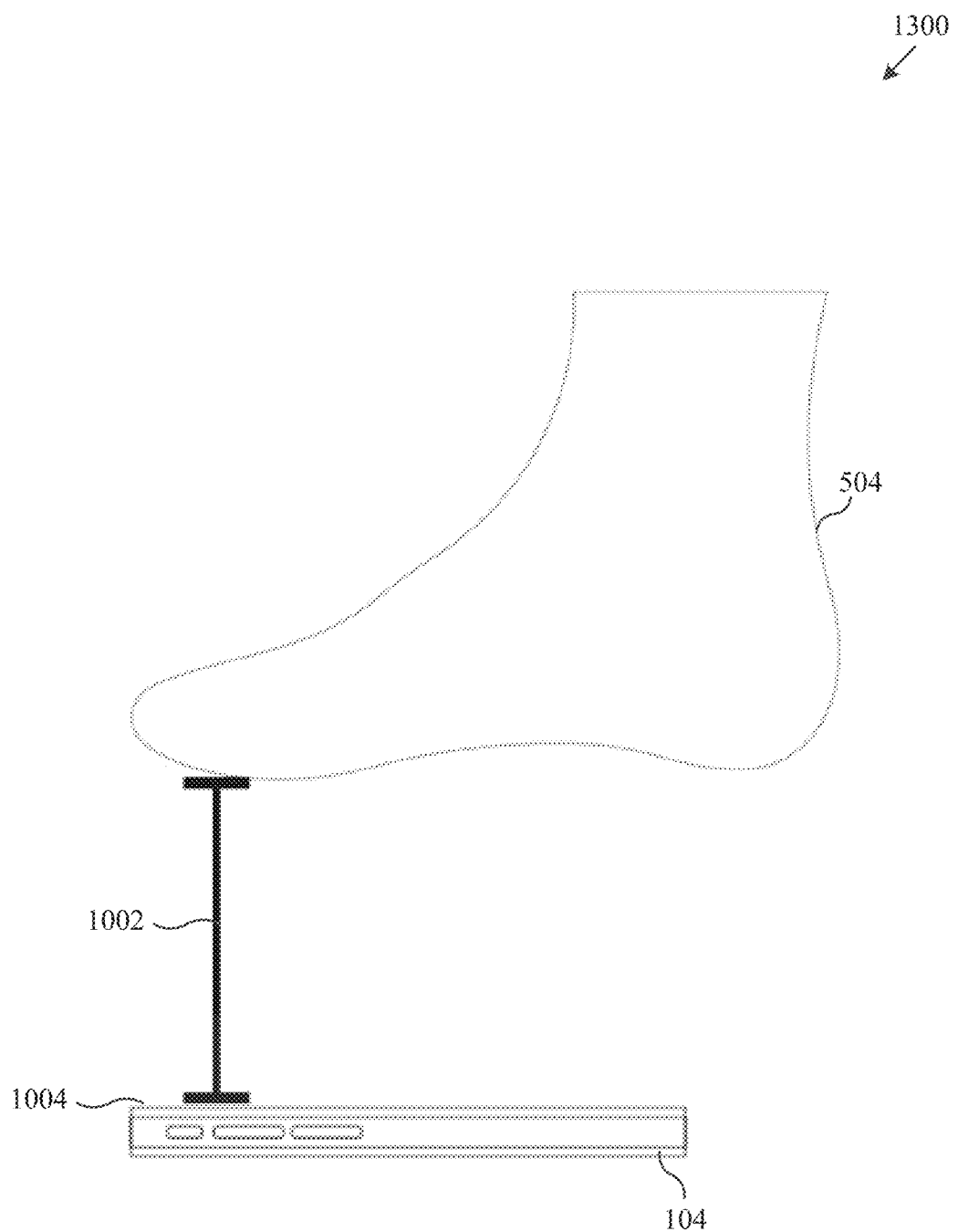
FIG. 13 illustrates an exemplary use case scenario, according to one embodiment of the present disclosure.

FIG. 13 shows an exemplary object (e.g., foot) sizing use case scenario 1300, according to one embodiment of the present disclosure. In particular embodiments, the computing device 104 (e.g., smartphone, tablet, etc.) includes a sensor 1004 that is used to measure the distance 1002 from the computing device 104 to the object 504 (e.g., foot), i.e., the depth of the object, such that the length of the object can be determined as discussed above. In some embodiments, the sensor may be a camera, an infrared sensor, a proximity sensor, accelerometer, light sensor, gyroscope, or any other suitable sensor. In one embodiment, the sensor may be included at the top of the computing device (e.g., above the display screen). In another embodiment, the sensor may be located at the bottom of the computing device (e.g., below the display screen) or at any suitable location on the computing device. In particular embodiments, the sensor may operate using various depth detecting methods (e.g., stereo triangulation, sheet of light triangulation, structured light, time-of-flight, interferometry, coded aperture, etc.). In one or more embodiments, the sensor may include a focal length, sensor height (in mm) and a sensor pixel count.

Figure 14:
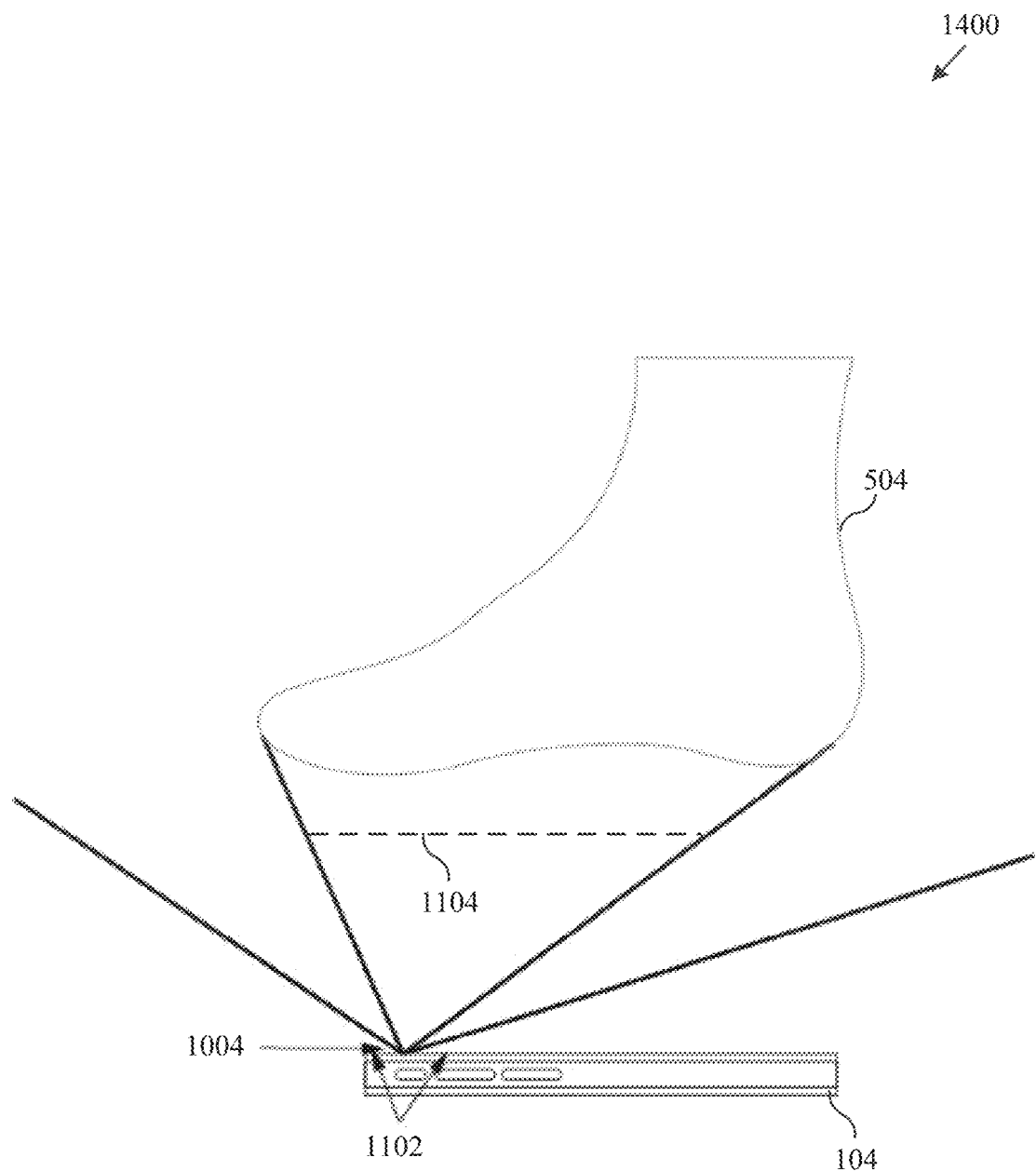
FIG. 14 illustrates an exemplary use case scenario, according to one embodiment of the present disclosure.

Now referring to FIG. 14, an exemplary object (e.g., foot) sizing use case scenario 1400 is shown, according to one embodiment of the present disclosure. In various embodiments, the sensor 1004 of the computing device includes a field of view ("FOV") 1102 in which the object 504 to be sized is positioned. In at least one embodiment, if the object to be sized is not positioned within the FOV, the system may reject the object and terminate. In another embodiment, if the object to be sized is not positioned within the FOV, the system may prompt the user (via the application interface) to reposition the object such that the object is within the FOV. In certain embodiments, the field of view may be calculated using the formula:

$$FOV = 2 \times \arctan\left(\frac{\text{sensor height (mm)}}{2 \times \text{focal length (mm)}}\right)$$

In certain embodiments, if there is no angle of inclination (e.g., the user's foot is positioned substantially straight relative to the computing device display), the system may calculate the length of the object (in millimeters) using various properties of the sensor. For example, first, the sensor height of the object 504 may be calculated using the formula:

$$\text{sensor object height} = \left(\frac{\text{sensor height (mm)} \times \text{sensor object height (pixels)}}{\text{sensor pixel count (pixels)}}\right)$$

Continuing with this example, upon obtaining the sensor height of the object 504, the length 1104 of the object (e.g., foot) 504 may then be calculated using the formula:

$$\text{Length} = \left(\frac{\text{depth (mm)} \times \text{sensor object height (mm)}}{\text{focal length (mm)}}\right)$$

Figure 15C:
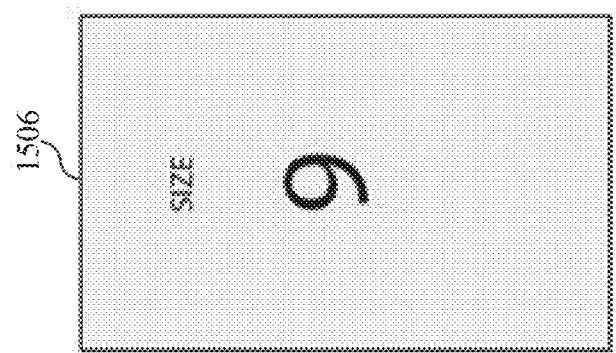
FIG. 15 (including FIGS. 15A-15C) illustrates exemplary screen displays of an exemplary foot sizing process, according to one embodiment of the present disclosure.
Figure 15B:
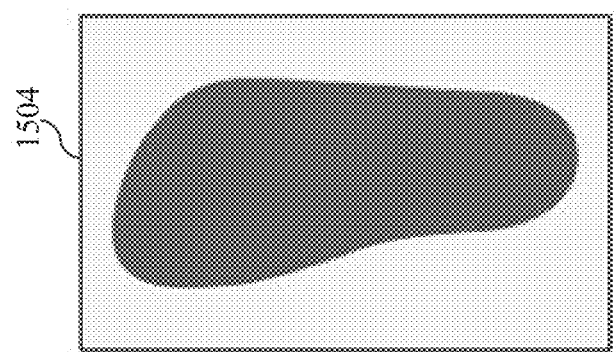
Figure 15A:
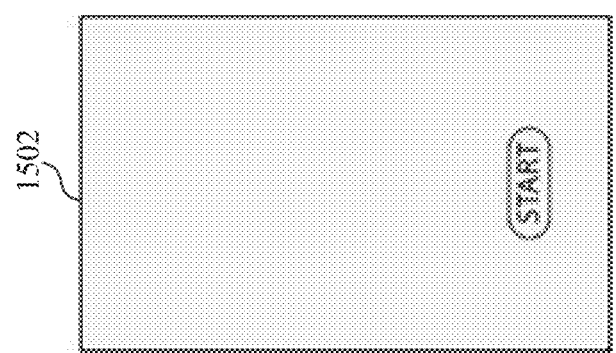

Turning now to FIG. 15 (including FIGS. 15A-15C), exemplary screen displays of an exemplary object (e.g., foot) sizing process are shown, according to one embodiment of the present disclosure. In various embodiments, and as shown in FIG. 15A, a first screen 1502 of the application interface includes an initialization button (or slider, switch, etc.) that allows the user to begin the sizing process. In at least one embodiment, the first screen may include user instructions to provide guidance on next steps. In particular embodiments, and as shown in FIG. 15B, a second screen 1504 of the application interface includes an outline (or silhouette, heat map, etc.) that tracks the movement of the foot (e.g., object) being sized. In one or more embodiments, and as shown in FIG. 15C, a third screen 1506 of the application interface includes a display of the user's calculated shoe (e.g., foot) size. In particular embodiments, and as discussed above, a user's foot size (e.g., shoe size) may be obtained by comparing the length of the user's foot (in mm) to a shoe-size conversion chart. As would be understood by a person having ordinary skill in the art, foot length measurements convert to different shoe sizes based on country specifications. An example of a shoe-size conversion chart for both men and women in the United States is shown above in relation to the discussion of FIG. 8.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method for automatically sizing a physical object via an electronic computing device, comprising the steps of:
   receiving an indication that the physical object is within a field of view of a sensor of the electronic computing device;
   identifying, via the sensor, a depth of the physical object from the sensor of the electronic computing device;
   determining, via the electronic computing device, an image of the physical object, wherein the image has an outline defining an outer boundary of the physical object, wherein a display of the electronic computing device is configured to show the image of the physical object and its corresponding movement;
   determining from the outer boundary of the physical object, a first end and a second end of the physical object;
   retrieving a pixel ratio corresponding to the electronic computing device;
   determining a pixel length between the first end and the second end of the physical object; and
   based on the depth, the pixel ratio, and the pixel length, calculating a physical length of the physical object.

2. The method of claim 1, wherein the sensor of the electronic computing device comprises an infrared sensor.

3. The method of claim 1, further comprising the step of prior to receiving the indication that the physical object is within the field of view of the sensor of the electronic computing device, detecting that the electronic computing device is substantially aligned with a horizontal surface.

4. The method of claim 1, further comprising the step of prior to identifying the depth of the physical object from the sensor, detecting that a bottom surface of the physical object is substantially parallel to the sensor of the electronic computing device.

5. The method of claim 4, wherein the depth of the physical object from the sensor is determined according to an average depth of the bottom surface of the physical object.

6. The method of claim 1, wherein the step of determining the image of the physical object further comprises using image recognition via machine learning based on stored images of prior objects.

7. The method of claim 1, wherein the step of determining the image of the physical object further comprises the steps of:
   identifying a pixel depth for each pixel associated with the field of view of the sensor;
   identifying a smallest pixel depth;
   identifying a subset of pixels in the field of view that are within a predefined threshold measure of the smallest pixel depth; and
   defining the subset of pixels as the image of the physical object.

8. The method of claim 1, further comprising the step of prior to determining the pixel length between the first end and the second end of the physical object, determining an angle of inclination of the physical object with respect to a longitudinal axis of the electronic computing device.

9. The method of claim 8, wherein the step of determining the pixel length between the first end and the second end further comprises using a trigonometric function to calculate the pixel length based on the angle of inclination.

10. The method of claim 1, wherein the physical object comprises a human foot.

11. The method of claim 10, wherein the physical length of the human foot is compared to a shoe size chart to identify a shoe size of a user associated with the human foot.

12. A system for automatically sizing a physical object, comprising:
- a database configured to store pixel ratios for electronic computing devices; and
- an electronic computing device in operative communication with the database, the electronic computing device having a display and a processor operative to:
  - receive an indication that the physical object is within a field of view of a sensor of the electronic computing device;
  - identify, via the sensor, a depth of the physical object from the sensor of the electronic computing device;
  - determine an image of the physical object, wherein the image has an outline defining an outer boundary of the physical object, wherein the display of the electronic computing device shows the image of the physical object and its corresponding movement;
  - determine from the outer boundary of the physical object a first end and a second end of the physical object;
  - retrieve a pixel ratio corresponding to the electronic computing device from the database;
  - determine a pixel length between the first end and the second end of the physical object; and
  - based on the depth, the pixel ratio, and the pixel length, calculate a physical length of the physical object.

13. The system of claim 12, wherein the sensor of the electronic computing device comprises an infrared sensor.

14. The system of claim 12, wherein the processor is further operative to, prior to receiving the indication that the physical object is within the field of view of the sensor of the electronic computing device, detect that the electronic computing device is substantially aligned with a horizontal surface.

15. The system of claim 12, wherein the processor is further operative to, prior to identifying the depth of the physical object from the sensor, detect that a bottom surface of the physical object is substantially parallel to the sensor of the electronic computing device.

16. The system of claim 15, wherein the depth of the physical object from the sensor is determined according to an average depth of the bottom surface of the physical object.

17. The system of claim 12, wherein determining the image of the physical object further comprises using image recognition via machine learning based on stored images of prior objects.

18. The system of claim 12, wherein the processor is further operative to, with respect to determining the image of the physical object:
- identify a pixel depth for each pixel associated with the field of view of the sensor;
- identify a smallest pixel depth;
- identify a subset of pixels in the field of view that are within a predefined threshold measure of the smallest pixel depth; and
- define the subset of pixels as the image of the physical object.

19. The system of claim 12, wherein the processor is further operative to, prior to determining the pixel length between the first end and the second end of the physical object, determine an angle of inclination of the physical object with respect to a longitudinal axis of the electronic computing device.

20. The system of claim 19, wherein determining the pixel length between the first end and the second end further comprises using a trigonometric function to calculate the pixel length based on the angle of inclination.

21. The system of claim 12, wherein the physical object comprises a human foot.

22. The system of claim 21, wherein the physical length of the human foot is compared to a shoe size chart to identify a shoe size of a user associated with the human foot.

* * * * *